United States Patent
Tang et al.

(10) Patent No.: US 10,915,741 B2
(45) Date of Patent: Feb. 9, 2021

(54) TIME DOMAIN ACTION DETECTING METHODS AND SYSTEM, ELECTRONIC DEVICES, AND COMPUTER STORAGE MEDIUM

(71) Applicant: Beijing SenseTime Technology Development Co., Ltd, Beijing (CN)

(72) Inventors: Xiaoou Tang, Beijing (CN); Yuanjun Xiong, Beijing (CN); Yue Zhao, Beijing (CN); Limin Wang, Beijing (CN); Zhirong Wu, Beijing (CN); Dahua Lin, Beijing (CN)

(73) Assignee: Beijing SenseTime Technology Development Co., Ltd, Beijing (CN)

( * ) Notice: Subject to any disclaimer, the term of this patent is extended or adjusted under 35 U.S.C. 154(b) by 30 days.

(21) Appl. No.: 16/234,897

(22) Filed: Dec. 28, 2018

(65) Prior Publication Data

US 2019/0138798 A1    May 9, 2019

Related U.S. Application Data

(63) Continuation of application No. PCT/CN2018/083924, filed on Apr. 20, 2018.

(51) Int. Cl.
*G06K 9/00* (2006.01)
*G06K 9/46* (2006.01)
(Continued)

(52) U.S. Cl.
CPC ..... *G06K 9/00335* (2013.01); *G06K 9/00744* (2013.01); *G06K 9/00751* (2013.01);
(Continued)

(58) Field of Classification Search
CPC ............. G06K 9/4628; G06K 9/00335; G06K 9/00751; G06K 9/00744; G06K 9/6262; G06N 3/08; G06N 3/0454; G06N 3/0481
See application file for complete search history.

(56) References Cited

U.S. PATENT DOCUMENTS

2016/0292510 A1* 10/2016 Han ................. G11B 27/06
2017/0083798 A1    3/2017 Yu et al.
2020/0057935 A1*  2/2020 Wang ............... G06N 3/0472

FOREIGN PATENT DOCUMENTS

CN    104933417         9/2015
CN    104933436 A       9/2015
(Continued)

OTHER PUBLICATIONS

International Search Report, PCT/CN2018/083924, dated Jun. 11, 2018, dated Jul. 5, 2018.
(Continued)

*Primary Examiner* — Brenda C Bernardi
(74) *Attorney, Agent, or Firm* — Garvey, Smith & Nehrbass, Patent Attorneys, L.L.C.; Seth M. Nehrbass; Fabian M. Nehrbass

(57) ABSTRACT

Time domain action detecting methods and systems, electronic devices, and computer storage medium are provided. The method includes: obtaining a time domain interval in a video with an action instance and at least one adjacent segment in the time domain interval; separately extracting action features of at least two video segments in candidate segments, where the candidate segments comprises video segment corresponding to the time domain interval and adjacent segments thereof; pooling the action features of the at least two video segments in the candidate segments, to obtain a global feature of the video segment corresponding to the time domain interval; and determining, based on the global feature, an action integrity score of the video segment corresponding to the time domain interval. The embodiments of the present disclosure benefit accurately determining whether a time domain interval comprises an integral action instance, and improve the accuracy rate of action integrity identification.

24 Claims, 6 Drawing Sheets

(51) Int. Cl.
*G06N 3/08* (2006.01)
*G06K 9/62* (2006.01)
(52) U.S. Cl.
CPC ............ *G06K 9/4628* (2013.01); *G06N 3/08* (2013.01); *G06K 9/6262* (2013.01)

(56) References Cited

FOREIGN PATENT DOCUMENTS

| | | |
|---|---|---|
| CN | 105354528 | 2/2016 |
| CN | 106203255 | 12/2016 |

OTHER PUBLICATIONS

Zhao, Jingxiong; Depth-Information Based Human Action Recognition; Department of Computer Science and Engineering—School of Electronic Information and Electrical Engineering—Shanghai Jiao Tong University; Jan. 21, 2015; Shanghai, P.R. China.

* cited by examiner

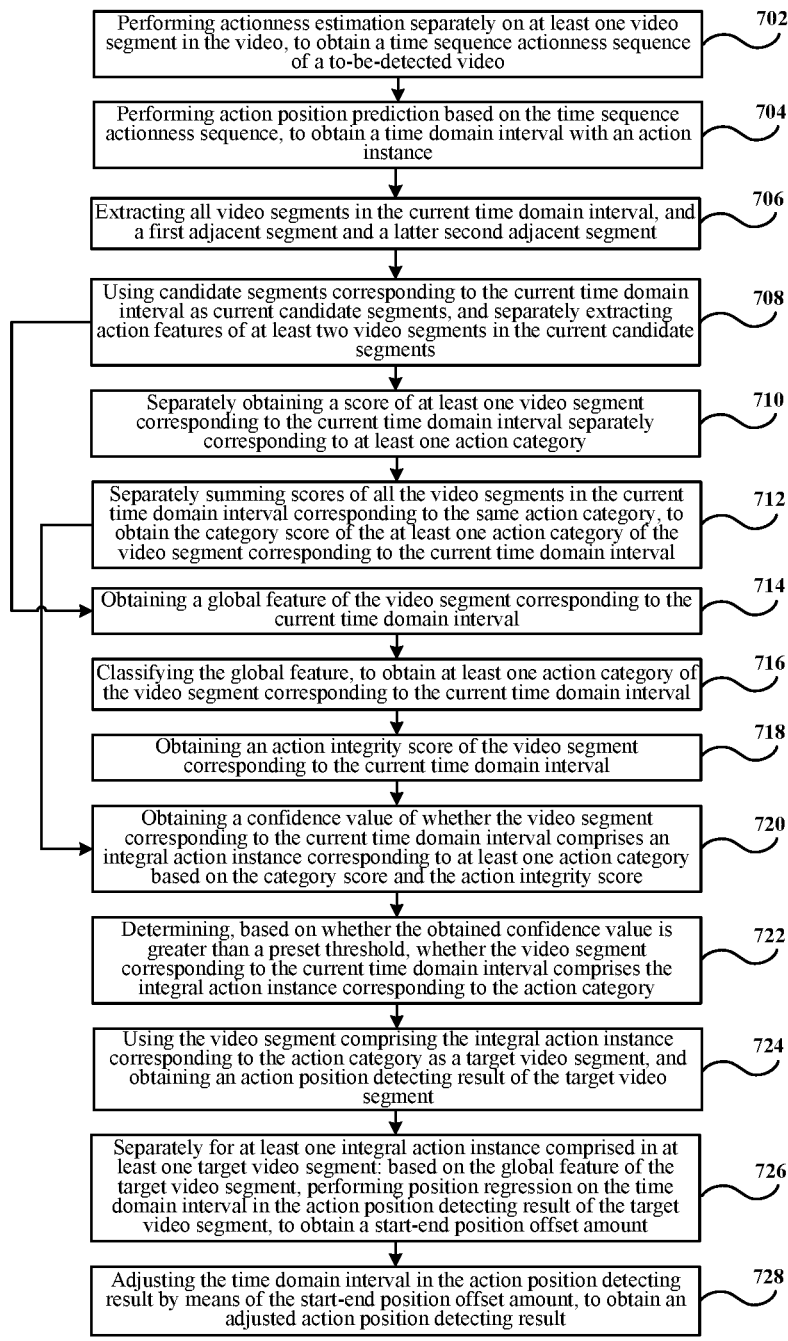

TIME DOMAIN ACTION DETECTING METHODS AND SYSTEM, ELECTRONIC DEVICES, AND COMPUTER STORAGE MEDIUM

CROSS-REFERENCE TO RELATED APPLICATIONS

The present disclosure is a continuation of International Application PCT/CN2018/083924, with an international filing date of Apr. 20, 2018, which claims priority to Chinese Patent Application No. 201710263004.2, filed with the Chinese Patent Office on Apr. 20, 2017, and entitled "TIME DOMAIN ACTION DETECTING METHODS AND SYSTEM, ELECTRONIC DEVICES, AND COMPUTER STORAGE MEDIUM," the contents of which are incorporated herein by reference in their entirety.

TECHNICAL FIELD

The present disclosure relates to computer vision technology, in particular, to time domain action detecting methods and system, electronic devices, and computer storage medium.

BACKGROUND

Understanding human behaviors and actions is an important task for the computer vision technology. A time domain action detecting technology aims at detecting an action segment related to a character activity in a video; the video may be a video in any form, for example, but not limited to, an unedited and long video. The time domain detecting technology has great application values in security monitoring, network video analyzing, video live-broadcasting analyzing, and even unmanned aerial vehicle flying fields.

SUMMARY

An embodiment of the present disclosure provides a time domain action detecting solution.

A time domain action detecting method provided according to one aspect of the embodiments of the present disclosure includes:

obtaining a time domain interval in a video with an action instance and at least one adjacent segment in the time domain interval;

separately extracting action features of at least two video segments in candidate segments, where the candidate segments comprise video segment corresponding to the time domain interval and adjacent segments thereof;

performing pooling processing on the action features of the at least two video segments in the candidate segments, to obtain a global feature of the video segment corresponding to the time domain interval; and determining, based on the global feature, an action integrity score of the video segment corresponding to the time domain interval.

According to one or more embodiments of the present disclosure, the at least one adjacent segment includes: a first adjacent segment in the video with a time sequence located in front of the time domain interval, and/or a second adjacent segment in the video with a time sequence located behind the time domain interval; and the first adjacent segment and the second segment respectively comprise at least one video segment.

According to one or more embodiments of the present disclosure, the obtaining a time domain interval in a video with an action instance and at least one adjacent segment in the time domain interval includes: performing actionness estimation separately on at least one video segment in the video, to obtain a time sequence actionness sequence; performing action position prediction based on the time sequence actionness sequence, to obtain the time domain interval in the video with an action instance, the time domain interval comprising a start time and an end time; and extracting, from the video, the first adjacent segment before the time domain interval and/or the second adjacent segment after the time domain interval.

According to one or more embodiments of the present disclosure, the performing actionness estimation separately on at least one video segment in the video, to obtain a time sequence actionness sequence includes: for any video segment in the video separately: extracting an image frame as an original image, and performing actionness estimation on the original image, to obtain a first actionness value; extracting a light stream of the any video segment, merging obtained light stream field pictures, to obtain a spliced light stream field image, and performing actionness estimation on the spliced light stream field image, to obtain a second actionness value; obtaining an actionness value of the any video segment from the first actionness value and the second actionness value; and forming the time sequence actionness sequence by the actionness values of all video segments based on a time sequence relation.

According to one or more embodiments of the present disclosure, after the obtaining the actionness value of any video segment, the method further includes: normalizing the actionness value of the any video segment, to obtain a normalized actionness value; and the time sequence actionness sequence comprising: a time sequence actionness sequence formed by the normalized actionness value.

According to one or more embodiments of the present disclosure, the method further includes: obtaining, based on the action feature of the video segment corresponding to the time domain interval, a category score of at least one action category of the video segment corresponding to the time domain interval; and determining, according to the category score of the at least one action category of the video segment corresponding to the time domain interval, a detected action category of the video segment corresponding to the time domain interval.

According to one or more embodiments of the present disclosure, the method further includes: outputting the time domain interval and the detected action category of the video segment corresponding to the time domain interval.

According to one or more embodiments of the present disclosure, the obtaining, based on an action feature of the video segment corresponding to the time domain interval, a category score of at least one action category of the video segment corresponding to the time domain interval comprises: separately obtaining, based on the action feature of the at least one video segment corresponding to the time domain interval, a score of the at least one video segment corresponding to the time domain interval separately belonging to the at least action category; and summing scores of the at least one video segment corresponding to the time domain interval separately belonging to the same action category, to obtain the category score of the at least one action category of the video segment corresponding to the time domain interval.

According to one or more embodiments of the present disclosure, the pooling the action features of the at least two video segments in the candidate segments comprises: performing time domain pyramid-typed pooling processing on the action features of the at least two video segments in the candidate segments.

According to one or more embodiments of the present disclosure, after the performing time domain pyramid-typed pooling processing on the action features of the at least two video segments in the candidate segments, the method further comprises: merging pooling features obtained after the time domain pyramid-typed pooling.

According to one or more embodiments of the present disclosure, before the performing time domain pyramid-typed pooling processing on the action features of the at least two video segments in the candidate segments, the method further comprises: presetting a value of the number K of pooling layers to be 1; the performing time domain pyramid-typed pooling processing on the action features of the at least two video segments in the candidate segments comprising: for any first to-be-pooled segment with a value of a preset partition part number $B_K$ to be 1, obtaining the pooling feature of the any first to-be-pooled segment from the action feature of the at least one video segment in the any first to-be-pooled segment; for any second to-be-pooled segment with the value of the preset partition part number $B_K$ to be greater than 1, segmenting all video segments in the any second to-be-pooled segment into $B_K$ parts, obtaining the pooling feature of a corresponding part separately from the action features of each part of the video segments in the $B_K$ parts, and merging the pooling features of the $B_K$ parts, to obtain the pooling feature of the any second to-be-pooled segment; and the first to-be-pooled segment comprising the video segment corresponding to the time domain interval, any one or more of the first adjacent segment and the second adjacent segment; the second to-be-pooled segment comprising other to-be-pooled segments in the candidate segments except the first to-be-pooled segment.

According to one or more embodiments of the present disclosure, before the performing time domain pyramid-typed pooling processing on the action features of the at least two video segments in the candidate segments, the method further comprises: presetting a value of the number K of pooling layers to be greater than 1; the performing time domain pyramid-typed pooling processing on the action features of the at least two video segments in the candidate segments comprising: separately for the $k^{th}$ pooling layer: for any first to-be-pooled segment with a value of a preset partition part number $B_K$ to be 1, obtaining the pooling feature of the any first to-be-pooled segment at the $k^{th}$ layer from the action feature of the at least one video segment in the any first to-be-pooled segment; for any second to-be-pooled segment with the value of the preset partition part number $B_K$ to be greater than 1, segmenting all video segments in the any second to-be-pooled segment into $B_K$ parts, obtaining the pooling feature of a corresponding part separately from the action features of each part of the video segments in the $B_K$ parts, and merging the pooling features of the $B_K$ parts, to obtain the pooling feature of the any second to-be-pooled segment at the $k^{th}$ layer; separately for at least one to-be-pooled segment: merging the pooling features of K pooling layers at a preset manner, to obtain the pooling feature of the at least one to-be-pooled segment; and the first to-be-pooled segment comprising the video segment corresponding to the time domain interval, any one or more of the first adjacent segment and the second adjacent segment; the second to-be-pooled segment comprising other to-be-pooled segments in the candidate segments except the first to-be-pooled segment.

According to one or more embodiments of the present disclosure, the merging pooling features obtained after the time domain pyramid-typed pooling, to obtain a global feature of the video segment corresponding to the time domain interval comprises: separately merging the pooling feature of the first adjacent segment, the pooling feature of the video segment corresponding to the time domain interval, and the pooling feature of the second adjacent segment, to obtain the global feature of the video segment corresponding to the time domain interval upon time sequence structuration.

According to one or more embodiments of the present disclosure, before the performing time domain pyramid-typed pooling processing on the action features of the at least two video segments in the candidate segments, the method further comprises: presetting a value of the number K of pooling layers to be greater than 1; the performing time domain pyramid-typed pooling processing on the action features of the at least two video segments in the candidate segments comprising: separately for the $k^{th}$ pooling layer: identifying whether the value of the preset partition part number $B_K$ is 1; if the value of the preset partition part number $B_K$ is 1, obtaining the pooling features of the candidate segments at the $k^{th}$ layer from the action feature of the at least one video segment in the candidate segments; and if the value of the preset partition part number $B_K$ is greater than 1, segmenting all video segments in the candidate segments into $B_K$ parts, obtaining the pooling feature of a corresponding part separately from the action features of each part of the video segments in the $B_K$ parts, and merging the pooling features of the $B_K$ parts, to obtain the pooling features of the candidate segments at the $k^{th}$ layer.

According to one or more embodiments of the present disclosure, the merging pooling features obtained after the time domain pyramid-typed pooling, to obtain a global feature of the video segment corresponding to the time domain interval comprises: merging the pooling features of K pooling layers at a preset manner, to obtain the global feature of the video segment corresponding to the time domain interval upon time sequence structuration.

According to one or more embodiments of the present disclosure, before the performing time domain pyramid-typed pooling processing on the action features of the at least two video segments in the candidate segments, the method further comprises: presetting a value of the number K of pooling layers to be 1; the performing time domain pyramid-typed pooling processing on the action features of the at least two video segments in the candidate segments comprising: identifying whether the value of the preset partition part number $B_K$ is 1; if the value of the preset partition part number $B_K$ is 1, separately for any to-be-pooled segment in at least two to-be-pooled segments, obtaining the pooling feature of the any to-be-pooled segment from the action features of the at least two video segments in the any to-be-pooled segment; the to-be-pooled segment comprising the video segments in the time domain interval, the first adjacent segment, and the second adjacent segment; merging the pooling features of all to-be-pooled segments, to obtain the global feature of the video segment corresponding to the time domain interval upon time sequence structuration; if the value of the preset partition part number $B_K$ is greater than 1, segmenting all video segments in the candidate segments into $B_K$ parts, obtaining the pooling feature of a corresponding part separately from the action features of each part of the video segments in the $B_K$ parts, and merging the pooling features of the $B_K$ parts, to obtain the global feature of the video segment corresponding to the time domain interval upon time sequence structuration.

According to one or more embodiments of the present disclosure, the determining, based on the global feature, an action integrity score of the video segment corresponding to the time domain interval comprises: classifying the global feature, to obtain at least one action category corresponding to the candidate segments; and separately identifying, based on the global feature, the integrity degree of an action instance in a current action category comprised in the video segment corresponding to the time domain interval by means of a classifier related to at least one action category corresponding to the candidate segments, to obtain the action integrity score of the video segment corresponding to the time domain interval separately corresponding to the at least one action category.

According to one or more embodiments of the present disclosure, the method further includes: determining, based on the category score and the action integrity score of the video segment corresponding to the time domain interval, whether the video segment corresponding to the time domain interval comprises an integral action instance corresponding to the at least one action category.

According to one or more embodiments of the present disclosure, the determining, based on the category score and the action integrity score of the video segment corresponding to the time domain interval, whether the video segment corresponding to the time domain interval comprises an integral action instance corresponding to the at least one action category comprises: separately for any action category corresponding to the video segment corresponding to the time domain interval, calculating a product or a sum of the category score and the action integrity score of the video segment corresponding to the time domain interval corresponding to the any action category, to obtain a confidence value of whether the video segment corresponding to the time domain interval comprises the integral action instance in the any action category; and determining, based on whether the confidence value is greater than a preset threshold, whether the video segment corresponding to the time domain interval comprises the integral action instance in the any action category.

According to one or more embodiments of the present disclosure, the method further includes: if the number of the action categories corresponding to the integral action instance comprised in the video segment corresponding to the time domain interval is greater than 1, selecting one action category corresponding to a maximum confidence value as a detected action category of the video segment corresponding to the time domain interval.

According to one or more embodiments of the present disclosure, the determining, based on the category score and the action integrity score of the video segment corresponding to the time domain interval, whether the video segment corresponding to the time domain interval comprises an integral action instance corresponding to the at least one action category comprises: identifying whether a preset action category with a category score greater than a preset first numeral value exists in the category scores of at least one action category of the video segment corresponding to the time domain interval; and identifying whether a preset action category with an action integrity score greater than a preset second numeral value exists in the action integrity scores; in response to existence of the preset action category with the category score greater than the preset first numeral value and/or the preset action category with the action integrity score greater than the preset second numeral value, using the preset action category with the category score greater than the preset first numeral value and/or the preset action category with the action integrity score greater than the preset second numeral value as a target action category, and determining, based on the category score and the action integrity score of the target action category corresponding to the video segment corresponding to the time domain interval, whether the video segment corresponding to the time domain interval comprises an integral action instance in the target action category; and when outputting the time domain interval and the detected action category of the video segment corresponding to the time domain interval, outputting the target action category and the time domain interval thereof.

According to one or more embodiments of the present disclosure, the method further includes: if the video segment corresponding to the time domain interval comprises the integral action instance of at least one action category, performing position regression on the time domain interval based on the global feature, to obtain a start-end position offset amount, the start-end position offset amount comprising a position offset amount between a start time and an end time in the time domain interval; adjusting the time domain interval by means of the start-end position offset amount; and when outputting the time domain interval and the detected action category of the video segment corresponding to the time domain interval, outputting the adjusted time domain interval and the detected action category of the video segment corresponding to the time domain interval.

A time domain action detecting system provided according to another aspect of the embodiments of the present disclosure includes:

a first obtaining module, configured to obtain a time domain interval in a video with an action instance and at least one adjacent segment in the time domain interval;

a feature extracting module, configured to separately extract action features of at least two video segments in candidate segments, where the candidate segments comprises video segment corresponding to the time domain interval and adjacent segments thereof;

a pooling processing module, configured to pool the action features of the at least two video segments in the candidate segments, to obtain a global feature of the video segment corresponding to the time domain interval; and a first determining module, configured to determine, based on the global feature, an action integrity score of the video segment corresponding to the time domain interval.

According to one or more embodiments of the present disclosure, the at least one adjacent segment comprises: a first adjacent segment in the video with a time sequence located in front of the time domain interval, and/or a second adjacent segment in the video with a time sequence located behind the time domain interval; and the first adjacent segment and the second segment respectively comprise at least one video segment.

According to one or more embodiments of the present disclosure, the first obtaining module comprises: an action estimation sub-module, configured to perform actionness estimation separately on at least one video segment in the video, to obtain a time sequence actionness sequence; a position prediction sub-module, configured to perform action position prediction based on the time sequence actionness sequence, to obtain the time domain interval in the video with an action instance, the time domain interval comprising a start time and an end time; and an extracting sub-module, configured to extract, from the video, the first adjacent segment before the time domain interval and/or the second adjacent segment after the time domain interval.

According to one or more embodiments of the present disclosure, the action estimation sub-module comprises: an image obtaining unit, configured to, for any video segment in the video separately: extract an image frame as an original image, extract a light stream of the any video segment, and merge obtained light stream field pictures, to obtain a spliced light stream field image; a first sub-convolutional neural network, configured to perform actionness estimation on the original image, to obtain a first actionness value; a second sub-convolutional neural network, configured to perform actionness estimation on the spliced light stream field image, to obtain a second actionness value; a computing unit, configured to obtain an actionness value of the any video segment from the first actionness value and the second actionness value of a same video segment; and forming the time sequence actionness sequence by the actionness values of all video segments based on a time sequence relation.

According to one or more embodiments of the present disclosure, the action estimation sub-module further comprises: a normalization unit, configured to normalize the actionness value of the video segment obtained by the computing unit, to obtain a normalized actionness value; and the time sequence actionness sequence comprising: a time sequence actionness sequence formed by the normalized actionness value.

According to one or more embodiments of the present disclosure, the system further includes: a second obtaining module, configured to obtain, based on the action feature of the video segment corresponding to the time domain interval, a category score of at least one action category of the video segment corresponding to the time domain interval; and a second determining module, configured to determine, according to the category score of the at least one action category of the video segment corresponding to the time domain interval, a detected action category of the video segment corresponding to the time domain interval.

According to one or more embodiments of the present disclosure, the system further includes: an output module, configured to output the time domain interval and the detected action category of the video segment corresponding to the time domain interval.

According to one or more embodiments of the present disclosure, the second obtaining module comprises: a first obtaining sub-module, configured to separately obtain, based on the action feature of the at least one video segment corresponding to the time domain interval, a score of the at least one video segment corresponding to the time domain interval separately belonging to the at least action category; and a first computing sub-module, configured to sum scores of the at least one video segment corresponding to the time domain interval separately belonging to the same action category, to obtain the category score of the at least one action category of the video segment corresponding to the time domain interval.

According to one or more embodiments of the present disclosure, the pooling processing module comprises: a pooling processing sub-module, configured to perform time domain pyramid-typed pooling processing on the action features of the at least two video segments in the candidate segments.

According to one or more embodiments of the present disclosure, the pooling processing module further comprises: a merging sub-module, configured to merge pooling features obtained after the time domain pyramid-typed pooling.

According to one or more embodiments of the present disclosure, the pooling processing module is further configured to preset a value of the number K of pooling layers to be 1; the pooling processing sub-module is configured to: for any first to-be-pooled segment with a value of a preset partition part number $B_K$ to be 1, obtain the pooling feature of the any first to-be-pooled segment from the action feature of the at least one video segment in the any first to-be-pooled segment; for any second to-be-pooled segment with the value of the preset partition part number $B_K$ to be greater than 1, segment all video segments in the any second to-be-pooled segment into $B_K$ parts, obtain the pooling feature of a corresponding part separately from the action features of each part of the video segments in the $B_K$ parts, and merge the pooling features of the $B_K$ parts, to obtain the pooling feature of the any second to-be-pooled segment; the first to-be-pooled segment comprises the video segment corresponding to the time domain interval, any one or more of the first adjacent segment and the second adjacent segment; and the second to-be-pooled segment comprises other to-be-pooled segments in the candidate segments except the first to-be-pooled segment; and the merging sub-module is configured to separately merge the pooling feature of the first adjacent segment, the pooling feature of the video segment corresponding to the time domain interval, and the pooling feature of the second adjacent segment, to obtain the global feature of the video segment corresponding to the time domain interval upon time sequence structuration.

According to one or more embodiments of the present disclosure, the pooling processing module is further configured to preset a value of the number K of pooling layers to be greater than 1; the pooling processing sub-module is configured to: separately for the $k^{th}$ pooling layer: for any first to-be-pooled segment with a value of a preset partition part number $B_K$ to be 1, obtain the pooling feature of the any first to-be-pooled segment at the $k^{th}$ layer from the action feature of the at least one video segment in the any first to-be-pooled segment; for any second to-be-pooled segment with the value of the preset partition part number $B_K$ to be greater than 1, segment all video segments in the any second to-be-pooled segment into $B_K$ parts, obtain the pooling feature of a corresponding part separately from the action features of the video segments of the parts, and merge the pooling features of the $B_K$ parts, to obtain the pooling feature of the any second to-be-pooled segment at the $k^{th}$ layer; and separately for at least one to-be-pooled segment: merge the pooling features of K pooling layers at a preset manner, to obtain the pooling feature of the at least one to-be-pooled segment; the first to-be-pooled segment comprises the video segment corresponding to the time domain interval, any one or more of the first adjacent segment and the second adjacent segment; the second to-be-pooled segment comprises other to-be-pooled segments in the candidate segments except the first to-be-pooled segment; and the merging sub-module is configured to separately merge the pooling feature of the first adjacent segment, the pooling feature of the video segment corresponding to the time domain interval, and the pooling feature of the second adjacent segment, to obtain the global feature of the video segment corresponding to the time domain interval upon time sequence structuration.

According to one or more embodiments of the present disclosure, the pooling processing module is further configured to preset a value of the number K of pooling layers to be greater than 1; the pooling processing sub-module is configured to: separately for the $k^{th}$ pooling layer: identify whether the value of the preset partition part number $B_K$ is 1; if the value of the preset partition part number $B_K$ is 1, obtain the pooling features of the candidate segments at the $k^{th}$ layer from the action feature of the at least one video segment in the candidate segments; and if the value of the preset partition part number $B_K$ is greater than 1, segment all video segments in the candidate segments into $B_K$ parts, obtain the pooling feature of a corresponding part separately from the action features of each part of the video segments in the $B_K$ parts, and merge the pooling features of the $B_K$ parts, to obtain the pooling features of the candidate segments at the $k^{th}$ layer; and the merging sub-module is configured to merge the pooling features of K pooling layers at a preset manner, to obtain the global feature of the video segment corresponding to the time domain interval upon time sequence structuration.

According to one or more embodiments of the present disclosure, the pooling processing module is further configured to preset a value of the number K of pooling layers to be 1; the pooling processing sub-module is configured to: identify whether the value of the preset partition part number $B_K$ is 1; if the value of the preset partition part number $B_K$ is 1, separately for any to-be-pooled segment in at least two to-be-pooled segments, obtain the pooling feature of the any to-be-pooled segment from the action features of the at least two video segments in the any to-be-pooled segment, the to-be-pooled segment comprising the video segments in the time domain interval, the first adjacent segment, and the second adjacent segment; and merge the pooling features of all to-be-pooled segments, to obtain the global feature of the video segment corresponding to the time domain interval upon time sequence structuration; and if the value of the preset partition part number $B_K$ is greater than 1, segment all video segments in the candidate segments into $B_K$ parts, obtain the pooling feature of a corresponding part separately from the action features of each part of the video segments in the $B_K$ parts, and merge the pooling features of the $B_K$ parts, to obtain the global feature of the video segment corresponding to the time domain interval upon time sequence structuration.

According to one or more embodiments of the present disclosure, the first determining module comprises: a classifying sub-module, configured to classify the global feature, to obtain at least one action category corresponding to the candidate segments; and at least one classifier separately related to at least one action category corresponding to the candidate segments, configured to identify, based on the global feature, the integrity degree of an action instance in a current action category comprised in the video segment corresponding to the time domain interval, to obtain the action integrity score of the video segment corresponding to the time domain interval separately corresponding to the at least one action category.

According to one or more embodiments of the present disclosure, the system further includes: a third determining module, configured to determine, based on the category score and the action integrity score of the video segment corresponding to the time domain interval, whether the video segment corresponding to the time domain interval comprises an integral action instance corresponding to the at least one action category.

According to one or more embodiments of the present disclosure, the third determining module comprises: a second computing sub-module, configured to, separately for any action category corresponding to the video segment corresponding to the time domain interval, calculate a product or a sum of the category score and the action integrity score of the video segment corresponding to the time domain interval corresponding to the any action category, to obtain a confidence value of whether the video segment corresponding to the time domain interval comprises the integral action instance in the any action category; and a determining sub-module, configured to determine, based on whether the confidence value is greater than a preset threshold, whether the video segment corresponding to the time domain interval comprises the integral action instance in the any action category.

According to one or more embodiments of the present disclosure, the determining sub-module is further configured to select, if the number of the action categories corresponding to the integral action instance comprised in the video segment corresponding to the time domain interval is greater than 1, one action category corresponding to a maximum confidence value as a detected action category of the video segment corresponding to the time domain interval.

According to one or more embodiments of the present disclosure, the system further includes: an identifying module, configured to identify whether a preset action category with a category score greater than a preset first numeral value exists in the category scores of at least one action category of the video segment corresponding to the time domain interval; and identify whether a preset action category with an action integrity score greater than a preset second numeral value exists in the action integrity scores; the third determining module, configured to, in response to existence of the preset action category with the category score greater than the preset first numeral value and/or the preset action category with the action integrity score greater than the preset second numeral value, use the preset action category with the category score greater than the preset first numeral value and/or the preset action category with the action integrity score greater than the preset second numeral value as a target action category, and determine, based on the category score and the action integrity score of the target action category corresponding to the video segment corresponding to the time domain interval, whether the video segment corresponding to the time domain interval comprise an integral action instance in the target action category; and the output module, configured to output the target action category and the time domain interval thereof.

According to one or more embodiments of the present disclosure, the system further includes: a position regression module, configured to, if the video segment corresponding to the time domain interval comprises the integral action instance of at least one action category, perform position regression on the time domain interval based on the global feature, to obtain a start-end position offset amount, and adjust the time domain interval by means of the start-end position offset amount; the start-end position offset amount comprising a position offset amount between a start time and an end time in the time domain interval; and the output module, configured to output the adjusted time domain interval and the detected action category of the video segment corresponding to the time domain interval. An electronic device provided according to still another aspect of the embodiments of the present disclosure includes the time domain action detecting system according to any one of the embodiments.

Another electronic device provided according to yet another aspect of the embodiments of the present disclosure includes a processor and a memory;

the memory, configured to store at least one executable instruction, and the executable instruction causing the processor to execute corresponding operations of the time domain action detecting method according to any one of the embodiments of the present disclosure.

A computer program provided according to yet another aspect of the embodiments of the present disclosure includes a computer-readable code, where when the computer-readable code runs in a device, a processor in the device executes instructions for implementing the steps of the time domain action detecting method according to any one of the embodiments of the present disclosure.

A computer storage medium provided by a further aspect of the embodiments of the present disclosure is configured to store computer-readable instructions, where when the instructions are executed, and the operations in the steps of the time domain action detecting method according to any one of the embodiments of the present disclosure are implemented.

A time domain action detecting apparatus, the apparatus comprising: at least one processor; and a memory storing instructions, the instructions when executed by the at least one processor, cause the at least one processor to perform operations, the operations comprising: obtaining a time domain interval in a video with an action instance and at least one adjacent segment in the time domain interval; separately extracting action features of at least two video segments in candidate segments, wherein the candidate segments comprise a video segment corresponding to the time domain interval and the adjacent segments thereof; pooling the action features of the at least two video segments in the candidate segments, to obtain a global feature of the video segment corresponding to the time domain interval; and determining, based on the global feature, an action integrity score of the video segment corresponding to the time domain interval.

Based on the time domain action detecting methods and systems, electronic devices, computer programs, and computer storage medium provided by the embodiments of the present disclosure, a time domain interval in a video with an action instance and at least one adjacent segment in the time domain interval are obtained, action features of the time domain interval and the at least adjacent segment of the time domain interval are extracted and performed with pooling processing, to obtain a global feature of the video segment corresponding to the time domain interval, and based on the global feature, an action integrity score of the video segment corresponding to the time domain interval is determined. The embodiments of the present disclosure relate to determining the action integrity of the video segment corresponding to the time domain interval based on the global feature comprising context information of the time domain interval, thereby benefiting accurate determination of whether the time domain interval includes an integral action instance, and improving an accuracy rate of action integrity identification.

The following further describes in detail the technical solutions of the present disclosure with reference to the accompanying drawings and embodiments.

BRIEF DESCRIPTION OF THE DRAWINGS

The accompanying drawings constituting a part of the specification are used for describing embodiments of the present disclosure and are intended to explain the principles of the present disclosure together with the descriptions.

According to the following detailed descriptions, the present disclosure can be understood more clearly with reference to the accompanying drawings.

FIG. 6 is a flowchart of an embodiment of determining an integrity score according to the embodiments of the present disclosure.

FIG. 7 is a flowchart of another embodiment of a time domain action detecting method according to the present disclosure.

DETAILED DESCRIPTION

Figure 1:
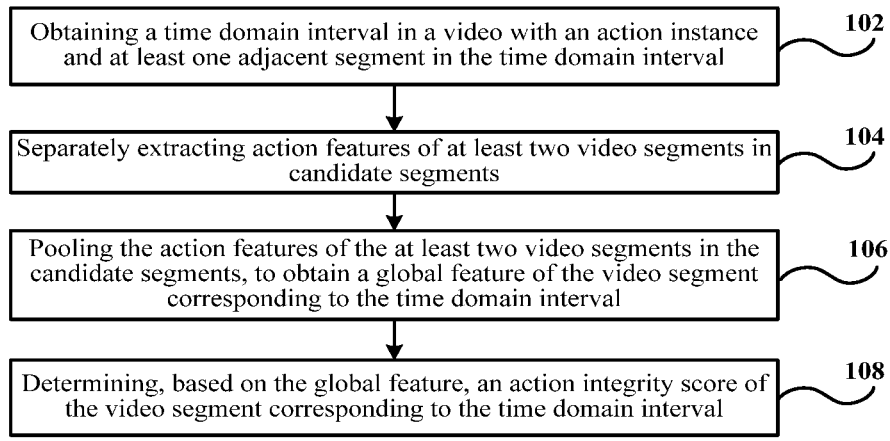
FIG. 1 is a flowchart of an embodiment of a time domain action detecting method according to the present disclosure.

Various illustrative embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, a size of each part shown in the accompanying drawings is not drawn in actual proportion.

The following descriptions of at least one illustrative embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (such as, program modules) executed by the computer system. Generally, the program modules may include routines, programs, target programs, components, logics, data structures, and the like, to perform specific tasks or implement specific abstract data types. The computer system/server may be practiced in the distributed cloud computing environments in which tasks are performed by remote processing devices that are linked through a communications network. In the distributed computing environments, program modules may be located in local or remote computing system storage medium including storage devices.

In the embodiments of the present disclosure, a Convolutional Neural Network (CNN) is a trained CNN, can implement corresponding operations recited in each embodiment of the present disclosure, such as, performing actionness estimation, classification, and integrity identification on an input image or video segment, to obtain an actionness value, a score with respect to each preset action category, and an integrity score with respect to each action category of the input image or video segment, and calculating a confidence value of candidate segments.

In the embodiments of the present disclosure, a video segment refers to a part in a video, and may include multiple continuous image frames in the video.

In the embodiments of the present disclosure, an action instance refers to a specific action of a certain action category.

In the embodiments of the present disclosure, actionness represents a degree that a certain image frame or a certain video segment may belong to a certain action instance.

In the embodiments of the present disclosure, integrity represents a degree that a candidate segment includes an integral action instance in a certain action category.

In the embodiments of the present disclosure, confidence coefficient represents a probability that a certain candidate segment is an integral action instance in a certain action category. An optional mathematical mode thereof is multiplying the probability that the candidate segment belongs to a certain action category by a probability that the candidate segment is an integral action instance in the action category.

FIG. 1 is a flowchart of an embodiment of a time domain action detecting method according to the present disclosure. As shown in FIG. 1, the time domain action detecting method of this embodiment includes:

102, a time domain interval in a video where an action instance may exist and at least one adjacent segment in the time domain interval are obtained.

The time domain interval includes a start time and an end time, for example, it may be represented as a start time and end time pair (start time, end time).

In an optional example, operation 102 may be performed by a processor by invoking a corresponding instruction stored in a memory, and may also be performed by a first obtaining module run by the processor.

Illustratively, the at least one adjacent segment includes: at least one of a first adjacent segment in the video with a time sequence located in front of the time domain interval, or a second adjacent segment in the video with a time sequence located behind the time domain interval. The first adjacent segment and the second segment respectively comprise at least one video segment. The length of the first adjacent segment and the length of the second adjacent segment may be set according to actual requirements, and may be adjusted and updated in real time. Illustratively, the length of the first adjacent segment and the length of the second adjacent segment may be a certain proportion of the length of the time domain interval, for example, 20% to 70%.

104, action features of at least two video segments in candidate segments are separately extracted.

The candidate segment includes the video segment corresponding to the time domain interval and adjacent segments thereof.

Optionally, operation 104 may separately extract action features of video segments in the candidate segments.

In an optional example, operation 104 may be performed by a processor by invoking a corresponding instruction stored in a memory, and may also be performed by a feature extracting module run by the processor.

106, pooling processing is performed on the action features of the at least two video segments in the candidate segments, to obtain a global feature of the video segment corresponding to the time domain interval.

In an optional example, operation 106 may be executed by a processor by invoking a corresponding instruction stored in a memory, or may be executed by a pooling processing module run by the processor.

108, based on the global feature, an action integrity score of the video segment corresponding to the time domain interval is determined.

In an optional example, operation 108 may be performed by a processor by invoking a corresponding instruction stored in a memory, and may also be performed by a first determining module run by the processor.

Based on the time domain action detecting methods provided by the embodiments of the present disclosure, a time domain interval in a video with an action instance and at least one adjacent segment in the time domain interval are obtained, action features of the time domain interval and the at least adjacent segment of the time domain interval are extracted and performed with pooling processing, to obtain a global feature of the video segment corresponding to the time domain interval, and based on the global feature, an action integrity score of the video segment corresponding to the time domain interval is determined. The embodiments of the present disclosure relate to determining the action integrity of the video segment corresponding to the time domain interval based on the global feature comprising context information of the time domain interval, thereby benefiting accurate determination of whether the time domain interval includes an integral action instance, and improving an accuracy rate of action integrity identification.

Optionally, in operation 102, obtaining a time domain interval in a video with an action instance and at least one adjacent segment in the time domain interval may specifically include:

performing actionness estimation separately on at least two video segments in the video, to obtain a time sequence actionness sequence;

performing action location prediction based on the time sequence actionness sequence, to obtain the time domain interval in the video with an action instance, the time domain interval comprising a start time and an end time; and extracting, from the video, at least one of the first adjacent segment before the time domain interval or the second adjacent segment after the time domain interval.

Adjacent segments in front of and behind each time domain interval include context information of the time domain interval; extracting the adjacent segments in front of and behind each time domain interval may obtain context information of the time domain interval of each action position prediction, so as to accurately identify whether the time domain interval includes an integral action instance in a certain action category by combining the context information, thereby positioning an integral action instance more accurately.

Figure 2:
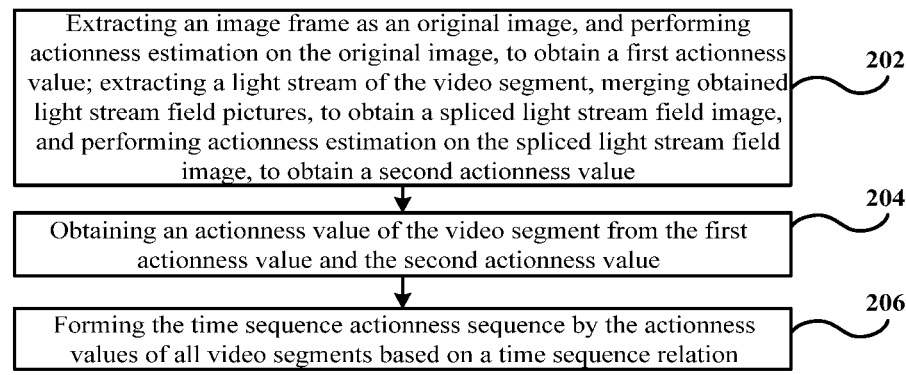
FIG. 2 is a flowchart of an embodiment of obtaining a time sequence actionness sequence according to the embodiments of the present disclosure.

FIG. 2 is a flowchart of an embodiment of obtaining a time sequence actionness sequence according to the embodiments of the present disclosure. As shown in FIG. 2, the embodiment may be implemented by means of the following operation: separately executing for any video segment in the video:

202, an image frame is extracted as an original image, and actionness estimation is performed on the original image, to obtain a first actionness value; a light stream of the video segment is extracted, obtained light stream field pictures are merged, to obtain a spliced light stream field image, and actionness estimation is performed on the spliced light stream field image, to obtain a second actionness value.

For example, an original image frame is extracted every several frames (e.g., 6 frames) from the video, the original image frame and five image frames behind are used as a video segment, a light stream of the original image frame and five image frames behind is extracted, to obtain a five light stream field picture frames. Alternatively, every six image frames in the video constitute a video segment, and an image frame is extracted from each video segment according to a preset rule or randomly as an original image.

The light stream field picture may be, for example, a gray scale image based on an 8-bit bitmap with 256 discrete gradations in total; a mid-value of the gray scale image is 128.

Since the light stream field is a vector field, when using a gray scale image to represent a light stream field picture, two scalar field pictures are required to represent the light stream field picture; i.e., two scalar field pictures respectively corresponding to X direction and Y direction amplitudes of coordinate axes of the light stream field picture.

Illustratively, assuming each video segment includes N image frames, calculation is performed separately based on each two adjacent image frames in the N image frames, to obtain N−1 groups of light stream field pictures, where each of the N−1 groups of light stream field pictures separately includes a transverse light stream image frame and a longitudinal light stream image frame. Pixel values of the light stream images are linearly mapped to an interval from 0 and 255 based on a standard of a mean value of 128. Then the N−1 groups of light stream field pictures, as a separate channel, are spliced into a spliced light stream field image of N−1 channels.

In an optional example, operation 202 may be executed by a processor by invoking a corresponding instruction stored in a memory, or may also be executed by an image obtaining unit, a first sub-convolutional neural network (sub-CNN), and a second sub-CNN in an action estimation sub-module run by the processor.

In an optional example, separately by means of two trained CNNs (the first and second sub-CNNs in the embodiments of the present disclosure), operations may be performed, for example, actionness estimation may be performed on an original image, to obtain a first actionness value, and actionness estimation may be performed on the spliced light stream field image to obtain a second actionness value.

Optionally, training may be performed on a first CNN module by means of a sample image marked with a reference first actionness value, to obtain the first sub-CNN; and training may be performed on a second CNN module by means of a sample spliced light stream field image marked with a reference second actionness value, to obtain the second sub-CNN.

Optionally, by means of the first CNN module, actionness estimation is performed on the sample image in a sample video; a first prediction actionness value is output; training is performed on the first CNN module based on a difference between the first prediction actionness value and the reference first actionness value, i.e., adjusting a network parameter value of the first CNN module until the difference between the first prediction actionness value and the reference first actionness value meets a preset condition, for example, less than a first preset threshold, so as to obtaining a trained first sub-CNN.

By means of the second CNN module, actionness estimation is performed on the sample spliced light stream field image; a second prediction actionness value is output; training is performed on the second CNN module based on a difference between the second prediction actionness value and the reference second actionness value, i.e., adjusting a network parameter value of the second CNN module until the difference between the second prediction actionness value and the reference second actionness value meets a preset condition, for example, less than a second preset threshold, so as to obtaining a trained second sub-CNN.

204, an actionness value of the video segment is obtained from the first actionness value and the second actionness value.

For example, the first actionness value and the second actionness value are added as well as combining the actionness value of the light stream field image at the same time, so as to obtain the more accurate actionness value of the video segment.

The actionness value of at least one video segment in the video can be obtained by means of operation 204; all the actionness values of the video segments in the video constitute an actionness sequence based on the time sequence, i.e., the actionness values according to time changes, which is referred to as a time sequence actionness sequence. For example, assuming M video segments are included in the video, the actionness estimation values thereof obtained by means of CNN calculation are A1-AM, respectively, the time sequence actionness sequence of the video may be represented as A1, A2, A3, . . . , AM.

In an optional example, operation 204 may be executed by a processor by invoking a corresponding instruction stored in a memory, or may be executed by a computing unit in the action estimation sub-module run by the processor.

Optionally, in another embodiment of obtaining the time sequence actionness sequence of the to-be-detected video, after the actionness value of the video segment is obtained by means of operation 204, selective execution may further be done:

206, the actionness value of the video segment is normalized, and the actionness value of the video segment is mapped to a range of [0, 1], to obtain a normalized actionness value. Therefore, based on the time sequence actionness sequence obtained in the embodiments, it may be a time sequence actionness sequence formed by the normalized actionness value, a form thereof is a one-dimensional function of the time-varying actionness value, and a value domain range is 0 to 1.

For example, Sigmoid function or Tan h function may be used to map the actionness value of at least one video segment to the range of [0. 1]. After at least one actionness value in the time sequence actionness sequence is normalized, each actionness value and differences among different actionness values may be represented more normative, so as to accurately perform action position prediction subsequently.

In an optional example, operation 206 may be executed by a processor by invoking a corresponding instruction stored in a memory, or may be executed by a normalization unit in the action estimation sub-module run by the processor.

In an example of the present disclosure, after obtaining the time sequence actionness sequence by means of the aforementioned embodiment, a preset action position prediction algorithm may be used, for example, a sliding window method, or a time sequence actionness aggregation algorithm, to obtain the action prediction time domain interval in the video by means of aggregation based on the time sequence actionness sequence.

Still taking the video including M segments as an example, for the time sequence actionness sequence A1, A2, A3, . . . , AM, one or more action instances may be obtained by means of aggregation through the time sequence actionness aggregation algorithm, which may be represented as, for example, A1, A2, A5, A6, or A7, where A1 and A2 represent that the first segment and the second segment in the video relate to an action instance, A5, A6, and A7 represent that the fifth, sixth, and seventh segments relate to an action instance. Since A1, A2, A3, . . . , AM relate to a sequence based on the time sequence, each element in the sequence has a corresponding time coordinate, thereby obtaining an occurrence time interval of each action instance, i.e., in the prediction time domain interval in the time domain, it represents a position of a series of video segments, in which an action instance may exist, in the time domain.

Hence, by generating the time sequence actionness sequence of the video according to the actionness values which are respectively corresponding to multiple segments in the video and then performing aggregation on the time sequence actionness sequence, the occurrence time of one or more action instances in the video (e.g., the start time and the end time) can be obtained. According to the embodiments of the present disclosure, the start time and end time of each action instance may be detected in each video, including edited videos and unedited original videos, to implement time domain action detection.

In addition, in another embodiment of the time domain action detecting method of the present disclosure, following operations may be further included:

obtaining, based on an action feature of the video segment corresponding to the time domain interval, a category score of at least one action category of the video segment corresponding to the time domain interval; and determining, according to the category score of the at least one action category of the video segment corresponding to the time domain interval, a detected action category of the video segment corresponding to the time domain interval.

In the embodiments of the present disclosure, the number of the action categories may be set according to actual application requirements, for example, when applied to multiple categories (N possible categories), the category scores of the at least one action category may include N+1: N category scores respectively corresponding to the video segment corresponding to the time domain interval and 1 background category score. Hence, the working category corresponding to the category score with the highest numeral value can be selected from the N+1 category scores as the detected action category of the video segment corresponding to the time domain interval.

In addition, the embodiments of the present disclosure may also be applied to identifying whether an action in a specific category exists in the video, the category score of the at least one action category may include two scores respectively corresponding to an action in a specific category existing in the video and an action in no specific category existing in the video.

Optionally, in an embodiment of the time domain action detecting method of the present disclosure, the time domain interval and the detected action category of the video segment corresponding to the time domain interval may be output, and output information may be represented as a three-element group (the action category, start time, and end time).

Hence, based on the time domain detecting method in the embodiments of the present disclosure, the time domain interval where an action may be included in the video and the action category to which the action belongs may be obtained, so as to accurately position to the position of the corresponding action category in the video.

Figure 3:
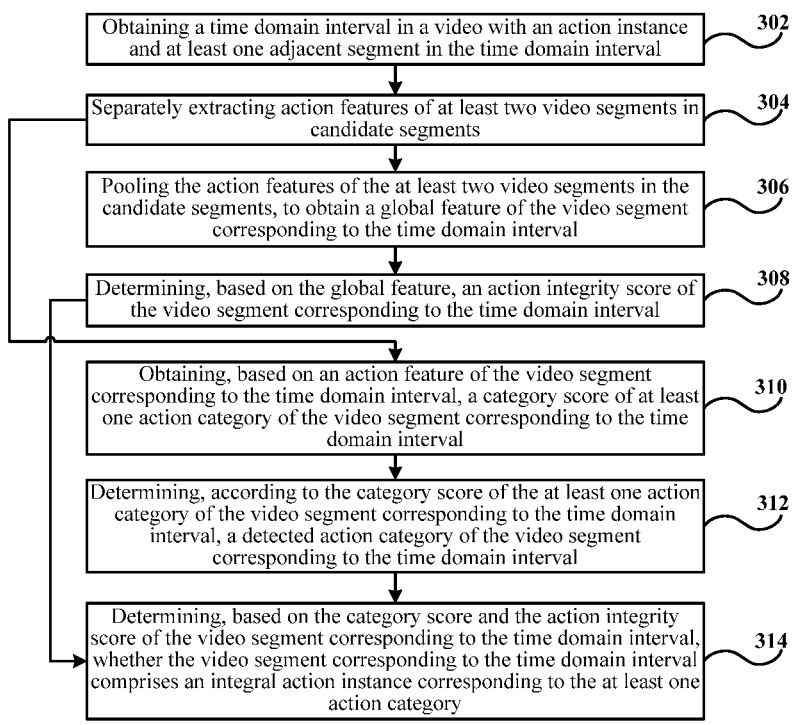
FIG. 3 is a flowchart of another embodiment of a time domain action detecting method according to the present disclosure.

FIG. 3 is a flowchart of another embodiment of a time domain action detecting method according to the present disclosure. As shown in FIG. 3, the time domain action detecting method of this embodiment includes:

302, a time domain interval in a video with an action instance and at least one adjacent segment in the time domain interval are obtained.

The time domain interval includes a start time and an end time, for example, it may be represented as a start time and end time pair (start time, end time).

In an optional example, the operation 302 may be performed by a processor by invoking a corresponding instruction stored in a memory, and may also be performed by a first obtaining module run by the processor.

Illustratively, the at least one adjacent segment includes: at least one of a first adjacent segment in the video with a time sequence located in front of the time domain interval, or a second adjacent segment in the video with a time sequence located behind the time domain interval. The first adjacent segment and the second segment respectively comprise at least one video segment.

304, action features of at least two video segments in candidate segments are separately extracted.

The candidate segment includes the video segment corresponding to the time domain interval and adjacent segments thereof.

Then, operations 306 and 310 are executed at the same time.

In an optional example, operation 304 may be performed by a processor by invoking a corresponding instruction stored in a memory, and may also be performed by a feature extracting module run by the processor.

306, pooling processing is performed on the action features of the at least two video segments in the candidate segments, to obtain a global feature of the video segment corresponding to the time domain interval.

In an optional example, time domain pyramid-typed pooling processing may be performed on the action features of the at least two video segments in the extracted candidate segments.

In an optional example, operation 306 may be executed by a processor by invoking a corresponding instruction stored in a memory, or may be executed by a pooling processing module run by the processor.

308, based on the global feature, an action integrity score of the video segment corresponding to the time domain interval is determined.

Then, operation 314 is executed.

In an optional example, operation 308 may be performed by a processor by invoking a corresponding instruction stored in a memory, and may also be performed by a first determining module run by the processor.

310, based on an action feature of the video segment corresponding to the time domain interval, a category score of at least one action category of the video segment corresponding to the time domain interval is obtained.

In an optional example, operation 310 may be performed by a processor by invoking a corresponding instruction stored in a memory, and may also be performed by a second obtaining module run by the processor.

Illustratively, operation 310 may be implemented by the following mode:

separately obtaining, based on the action feature of the at least one video segment corresponding to the time domain interval, a score of the at least one video segment corresponding to the time domain interval separately belonging to the at least action category; and summing scores of the at least one video segment corresponding to the time domain interval separately belonging to the same action category, to obtain the category score of the at least one action category of the video segment corresponding to the time domain interval.

312, according to the category score of the at least one action category of the video segment corresponding to the time domain interval, a detected action category of the video segment corresponding to the time domain interval is determined.

In an optional example, operation 312 may be performed by a processor by invoking a corresponding instruction stored in a memory, and may also be performed by a second determining module run by the processor.

314, based on the category score and the action integrity score of the video segment corresponding to the time domain interval, whether the video segment corresponding to the time domain interval comprises an integral action instance corresponding to the at least one action category is determined.

In an optional example, operation 314 may be performed by a processor by invoking a corresponding instruction stored in a memory, and may also be performed by a third determining module run by the processor.

If the video segment corresponding to the time domain interval includes an integral action instance of the corresponding at least one action category, the time domain interval and the detected action category of the video segment corresponding to the time domain interval may be output, and output information may be represented as a three-element group (the detected action category, start time, and end time). Otherwise, the video segment corresponding to the time domain interval does not include an integral action instance of the corresponding at least one action category, the time domain interval and the detected action category of the video segment corresponding to the time domain interval may not be output.

Based on the time domain action detecting method provided by the embodiments of the present disclosure, after performing action position prediction on the video to obtain the position which may include an action (i.e., the time domain interval), extracting adjacent segments in front of and behind each time domain interval may obtain context information of the time domain interval of each action position prediction; whether the video segment corresponding to the time domain interval includes an integral action instance of the action category is determined by means of the category score and action integrity score of the video segment corresponding to the time domain interval belonging to at least one action category, thereby obtaining the action position detecting result of the integral action instance included in the video. Based on the embodiments of the present disclosure, the video segment including an integral action instance of at least one action category or a specific action category in the video may be identified, to implement accurate identification and precise positioning of the integral action instance of at least one action category or a specific action category; moreover, the score and action integrity score of the video segment corresponding to the time domain interval belonging to at least one action category can be obtained at the same time, thereby improving the execution efficiency of the entire time domain action detecting process and saving the detecting time.

In an optional example, in operation 306, structured time domain pyramid-typed pooling processing may be performed on the action features of the at least two video segments in the extracted candidate segments based on preset configuration rules, to obtain the global feature of the video segment corresponding to the time domain interval.

In the embodiments of the present disclosure, the pyramid-typed refers to: the action features of the video segments with different lengths in the candidate segments are located at different layers, and the action features of the video segments located at different layers with different lengths form a pyramid shape. For example, a first layer (a bottom layer) of the pyramid includes action features of the entire candidate segments, a second layer (the number of layers of the pyramid from bottom to top is increased in sequence) of the pyramid includes the action features of the video segments corresponding to the time domain interval in the candidate segments. As a special example in a pyramid-typed structure of the embodiments of the present disclosure, the pyramid-typed structure may also include a layer only; the layer includes the action features of the entire candidate segments.

In the embodiments of the present disclosure, a structured time domain pyramid-typed pooling method is provided; separately extracting time-space features in front of, behind, and in the time domain interval for multilayer time domain pyramid-typed pooling may constitute the structured global feature of the candidate segments in any length, and express action features based on the time sequence, thereby positioning the video segment where an action instance in a certain action category more accurately based on the action feature of at least one granularity and the change of the action feature in time at the same time.

In one optional example, one possible configuration rule may include: at least one of the number K of pooling layers, the partition part number BK of the video segment corresponding to the time domain interval, the first adjacent segment, or the second adjacent segment in each layer, wherein the values of K and BK are integers greater than or equal to 1, separately. The number K of pooling layers of the video segment corresponding to the time domain interval, the first adjacent segment, and the second adjacent segment during three phases may be the same or different, and the partition part number BK at the same layer may also be the same or different.

Hence, in an optional example, the value of the number K of pooling layers is preset to be 1. Correspondingly, the performing time domain pyramid-typed pooling processing on the action features of the at least two video segments in the extracted candidate segments includes:

for any first to-be-pooled segment with a value of a preset partition part fraction BK to be 1, obtaining the pooling feature of the any first to-be-pooled segment from the action feature of the at least one video segment in the any first to-be-pooled segment; and for any second to-be-pooled segment with the value of the preset partition part fraction BK to be greater than 1, segmenting all video segments in the any second to-be-pooled segment into BK parts, obtaining the pooling feature of a corresponding part separately from the action features of each part of the video segments in the BK parts, and merging the pooling features of the BK parts, to obtain the pooling feature of the any second to-be-pooled segment;

where the first to-be-pooled segment includes the video segment corresponding to the time domain interval, any one or more of the first adjacent segment and the second adjacent segment; the second to-be-pooled segment includes other to-be-pooled segments in the candidate segments except the first to-be-pooled segment. For example, if the first to-be-pooled segment includes the video segment corresponding to the time domain interval, the second to-be-pooled segment includes the first adjacent segment and the second adjacent segment; and if the first to-be-pooled segment includes the video segment corresponding to the time domain interval and the first adjacent segment, the second to-be-pooled segment includes the second adjacent segment.

In a second possible example, the value of the number K of pooling layers is preset to be greater than 1. Correspondingly, the performing time domain pyramid-typed pooling processing on the action features of the at least two video segments in the candidate segments includes:

separately for a kth pooling layer: for any first to-be-pooled segment with a value of a preset partition part number BK to be 1, obtaining the pooling feature of the any first to-be-pooled segment at the kth layer from the action feature of the at least one video segment in the any first to-be-pooled segment; for any second to-be-pooled segment with the value of the preset partition part number BK to be greater than 1, segmenting all video segments in the any second to-be-pooled segment into BK parts, obtaining the pooling feature of a corresponding part separately from the action features of each part of the video segments in the BK parts, and merging the pooling features of the BK parts, to obtain the pooling feature of the any second to-be-pooled segment at the kth layer; and separately for at least one to-be-pooled segment: merging the pooling features of K pooling layers at a preset manner, to obtain the pooling feature of the at least one to-be-pooled segment;

where the first to-be-pooled segment includes the video segment corresponding to the time domain interval, any one or more of the first adjacent segment and the second adjacent segment; the second to-be-pooled segment includes other to-be-pooled segments in the candidate segments except the first to-be-pooled segment.

In another optional example base on the first and second examples, after the performing time domain pyramid-typed pooling processing on the action features of the at least two video segments in the candidate segments, the method further includes: merging pooling features obtained after the time domain pyramid-typed pooling, to obtain the global feature of the video segment corresponding to the time domain interval.

Optionally, separately merging the pooling feature of the first adjacent segment, the pooling feature of the video segment corresponding to the time domain interval, and the pooling feature of the second adjacent segment may be performed, to obtain the global feature of the video segment corresponding to the time domain interval upon time sequence structuration.

In any embodiment of the present disclosure, the time sequence structure refers to a structure in a time relation formed by constructions and combinations at different phases. The global feature is the action feature of the entire candidate segment, including a more comprehensive action feature as compared with the corresponding time domain interval.

In an optional example, another possible configuration rule may include: the number K of pooling layers and a partition part number BK of the candidate segments, where the values of K and BK are integers greater than or equal to 1.

Hence, in a third possible example, the value of the number K of pooling layers is preset to be greater than 1. Correspondingly, the performing time domain pyramid-typed pooling processing on the action features of the at least two video segments in the candidate segments includes:

separately for the kth pooling layer: identifying whether the value of the preset partition part fraction BK is 1;

if the value of the preset partition part number BK is 1, obtaining the pooling features of the candidate segments at the kth layer from the action feature of the at least one video segment in the candidate segments; and if the value of the preset partition part number BK is greater 1, segmenting all video segments in the candidate segments into BK parts, obtaining the pooling feature of a corresponding part separately from the action features of each part of the video segments in the BK parts, and merging the pooling features of the BK parts, to obtain the pooling features of the candidate segments at the kth layer.

In another optional example base on the third example, after the performing time domain pyramid-typed pooling processing on the action features of the at least two video segments in the candidate segments, the method further includes: merging pooling features obtained after the time domain pyramid-typed pooling, to obtain the global feature of the video segment corresponding to the time domain interval.

Optionally, merging the pooling features of K pooling layers at a preset manner may be performed, to obtain the global feature of the video segment corresponding to the time domain interval upon time sequence structuration.

In a fourth possible example, based on another possible configuration rule, the value of the number K of pooling layers is preset to be 1. Correspondingly, the performing time domain pyramid-typed pooling processing on the action features of the at least two video segments in the candidate segments includes:

identifying whether the value of the preset partition part fraction BK is 1;

if the value of the preset partition part number BK is 1, separately for any to-be-pooled segment in at least two to-be-pooled segments, obtain the pooling feature of the any to-be-pooled segment from the action features of the at least two video segments in the any to-be-pooled segment; the to-be-pooled segment comprising the video segments in the time domain interval, the first adjacent segment, and the second adjacent segment; and merge the pooling features of all to-be-pooled segments, to obtain the global feature of the video segment corresponding to the time domain interval upon time sequence structuration; and if the value of the preset partition part fraction BK is greater than 1, segmenting at least one video segment in the candidate segments into BK parts, obtaining the pooling feature of a corresponding part separately from the action features of each part of the video segments in the BK parts, and merging the pooling features of the BK parts, to obtain the global feature of the video segment corresponding to the time domain interval upon time sequence structuration.

The plurality of examples in the present disclosure illustratively provide multiple methods for performing time domain pyramid-typed pooling based on time-space features of the time domain interval and adjacent intervals thereof, and may constitute a global feature for segments with any length, different levels, and different granularity, so as to select, according to actual requirements and computing resources, a corresponding pyramid-typed pooling method to obtain a corresponding global feature, to detect the integrity of the time domain interval comprising a certain type of action.

Figure 4:
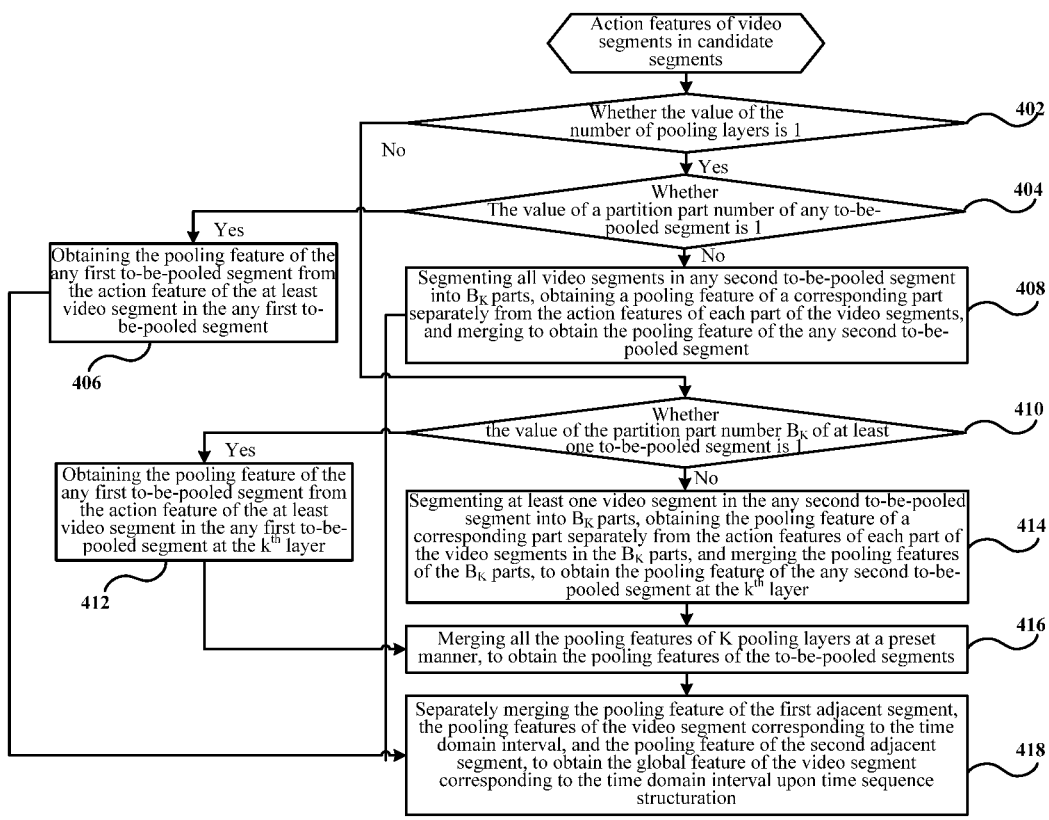
FIG. 4 is a flowchart of an embodiment of obtaining a global feature according to the embodiments of the present disclosure.

FIG. 4 is a flowchart of an embodiment of obtaining a global feature according to the embodiments of the present disclosure. The configuration rule in the embodiment may include: at least one of the number K of pooling layers, the partition part number BK of the video segment corresponding to the time domain interval, the first adjacent segment, or the second adjacent segment in each layer, where the values of K and BK are integers greater than or equal to 1, separately. The number of pooling layers K of the video segment in the time domain interval, the first adjacent segment, and the second adjacent segment during three phases may be the same or different, and the partition part number BK at the same layer may also be the same or different.

In an optional example, operation of obtaining the global feature as shown in FIG. 4 may be executed by a processor by invoking a corresponding instruction stored in a memory, or may be executed by a pooling processing sub-module run by the processor.

As shown in FIG. 4, in the embodiment, performing pooling processing on the action features of the at least two video segments in the candidate segments, and merging pooling features obtained after the time domain pyramid-typed pooling, to obtain the global feature of the video segment corresponding to the time domain interval includes:

402, whether the value of the number K of pooling layers in the configuration rule is 1 is identified.

If the value of the number K of pooling layers is 1, operation 404 is executed. Otherwise, if the value of the number K of pooling layers is greater than 1, operation 410 is executed.

404, separately for any to-be-pooled segment in the candidate segments, whether the value of the partition part number BK of the any to-be-pooled segment to be 1 is identified.

The to-be-pooled segment includes the video segment corresponding to the time domain interval, the first adjacent segment, and the second adjacent segment.

For the to-be-pooled segment with the partition part number BK to be 1, it is called a first to-be-pooled segment; and for any first to-be-pooled segment therein, operation 406 is executed. For the to-be-pooled segment with the partition part number BK to be greater than 1, it is called a second to-be-pooled segment; and for any second to-be-pooled segment therein, operation 408 is executed.

The first to-be-pooled segment includes the video segment corresponding to the time domain interval, any one or more of the first adjacent segment and the second adjacent segment; the second to-be-pooled segment includes other to-be-pooled segments in the candidate segments except the first to-be-pooled segment.

406, the pooling feature of the any first to-be-pooled segment is obtained from the action feature of the at least video segment in the any first to-be-pooled segment.

Then, operation 418 is executed.

408, all video segments in any second to-be-pooled segment are segmented into BK parts, a pooling feature of a corresponding part is obtained separately from the action features of each part of the video segments in the BK parts, and the pooling features of the BK parts are merged to obtain the pooling feature of the any second to-be-pooled segment.

Then, operation 418 is executed.

410, separately for the kth pooling layer: whether the value of the partition part number BK of at least one to-be-pooled segment to be 1 is identified.

The to-be-pooled segment includes the video segment corresponding to the time domain interval, the first adjacent segment, and the second adjacent segment. The value of k is greater than 0 and less than or equal to K.

For any first to-be-pooled segment with the partition part number BK to be 1, it is called a first to-be-pooled segment; and for any first to-be-pooled segment therein, operation 412 is executed. For the to-be-pooled segment with the partition part number BK to be greater than 1, it is called a second to-be-pooled segment; and for any second to-be-pooled segment therein, operation 414 is executed.

412, the pooling feature of the any first to-be-pooled segment is obtained from the action feature of the at least video segment in the any first to-be-pooled segment at the kth layer.

Then, operation 416 is executed.

414, at least one video segment in the any second to-be-pooled segment is segmented into BK parts, a pooling feature of a corresponding part is obtained separately from the action features of each part of the video segments in the BK parts, and the pooling features of the BK parts are merged, to obtain the pooling feature of the any second to-be-pooled segment at the kth layer.

416, separately for at least one to-be-pooled segment: the pooling features of K pooling layers are merged at a preset manner, to obtain the pooling feature of the at least one to-be-pooled segment.

418, the pooling feature of the first adjacent segment, the pooling feature of the video segment corresponding to the time domain interval, and the pooling feature of the second adjacent segment are merged separately, to obtain the global feature of the video segment corresponding to the time domain interval upon time sequence structuration.

Taking the following application as an example, the structuralized time domain pyramid-typed pooling method of the present disclosure is further explained in detail as follows:

For any time domain interval (start time, end time) obtained by means of action position prediction, three phases are included in total, i.e., inside, in front of, and behind the time domain interval (i.e., the video segment in the time domain interval, the first adjacent segment, and the second adjacent segment in the embodiment of the present disclosure); each phase includes multiple small video segments; for each video segment, feature extraction is performed by means of the CNN for the action category, so as to obtain one action feature, which may be embodied as a group of feature vectors vt. For the feature vectors vs, . . . , ve, of all the video segments s, . . . , e in the time domain interval, the time domain pyramid at a kth layer takes the video segments s, . . . , e as a whole to be evenly segmented into BK parts, and the start and end segments for each part are ski, . . . , eki, and then, for an ith part at the kth layer, a mean value of vski, . . . veki are calculated (in addition, a maximum value or a minimum value thereof may be removed according to a preset rule), as a pooling vector for representing the part information; the pooling vectors of the BK part are merged according to the time sequence of the video segments and used as the pooling vector at the kth layer; then all the pooling vectors at the kth layer of the video segment corresponding to the time domain interval are merged according to the time sequence of the video segments, for example, averagely merging, to obtain a pooling vector of a time domain interval.

Similarly, similar operations may also be performed on the first adjacent segment and the second adjacent segment; the pooling vector (i.e., the global feature) of the time sequence structured structure finally obtained is formed by combining the pooling vectors in the three phases of the video segment in the time domain interval, the first adjacent segment, and the second adjacent segment, where the configuration rules for the number K of pooling layers and the partition part number BK in different phases may be different, for example, the configuration rule is: the partition part number of each layer is increased in sequence from a first layer to a higher layer.

Figure 5:
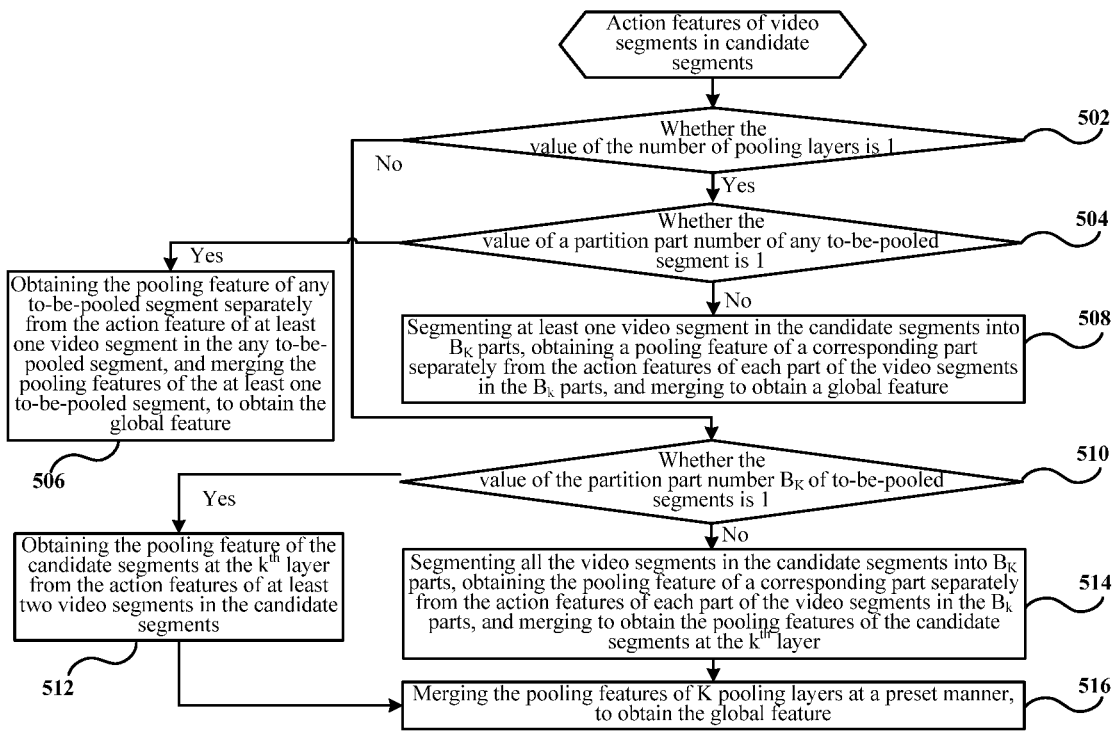
FIG. 5 is a flowchart of another embodiment of obtaining a global feature according to the embodiments of the present disclosure.

FIG. 5 is a flowchart of another embodiment of obtaining a global feature according to the embodiments of the present disclosure.

In an optional example, operation of obtaining the global feature as shown in FIG. 5 may be executed by a processor by invoking a corresponding instruction stored in a memory, or may be executed by a pooling processing sub-module run by the processor.

In the embodiment, the possible configuration rule may include: the number K of pooling layers and a partition part number BK of the candidate segments, where the values of K and BK are integers greater than or equal to 1, separately. As shown in FIG. 5, the embodiment includes:

502, whether the value of the number K of pooling layers in the configuration rule is 1 is identified.

If the value of the number K of pooling layers is 1, operation 504 is executed. Otherwise, if the value of the number K of pooling layers is greater than 1, operation 510 is executed.

504, whether the value of the partition part number BK to be 1 is identified.

If the value of the partition part number BK is 1, operation 506 is executed. If the value of the partition part number BK is greater than 1, operation 508 is executed.

506, separately for any to-be-pooled segment in at least one to-be-pooled segment, the pooling feature of the any to-be-pooled segment is obtained from the action feature of the at least one video segment in the any to-be-pooled segment, and the pooling features of the at least one to-be-pooled segment are merged, to obtain a global feature of the video segment corresponding to the time domain interval upon time sequence structuration.

The to-be-pooled segment includes the video segment corresponding to the time domain interval, the first adjacent segment, and the second adjacent segment.

Then, following procedures of this embodiment are not executed.

508, at least one video segment in the candidate segments is segmented into BK parts, for example, al the video segments in the candidate segments may be segmented into BK parts evenly, to obtain a pooling feature of a corresponding part separately from the action features of each part of the video segments in the BK parts, and the pooling features of the BK parts are merged, to obtain the global feature of the segment corresponding to the time domain interval upon time sequence structuration.

Then, following procedures of this embodiment are not executed.

510, separately for the kth pooling layer: whether the value of the partition part number BK to be 1 is identified, where the value of k is greater than 0 and less than or equal to K.

If the value of the partition part number BK is 1, operation 512 is executed. If the partition part number BK is greater than 1, operation 514 is executed.

512, the pooling features of the candidate segments at the kth layer are obtained from action features of at least two video segments in the candidate segments.

Then, operation 516 is executed.

514, all the video segments in the candidate segments are segmented into BK parts, a pooling feature of a corresponding part is obtained separately from the action features of each part of the video segments in the BK parts, and the pooling features of the BK parts are merged, to obtain a pooling feature of the candidate segments at the kth layer.

516, the pooling features of K pooling layers are merged at a preset manner may be performed, to obtain the global feature of the video segment corresponding to the time domain interval upon time sequence structuration.

Taking the following application as an example, the structuralized time domain pyramid-typed pooling method of the present disclosure is further explained in detail as follows: in the application example, the value of K is 2, and the value of BK is 2:

For one candidate segment, the first layer (i.e., a bottom layer) of the pyramid is the entire candidate segment, and the first layer is processed first, i.e., evenly merging the feature vectors of the at least two video segments in the entire candidate segment to obtain a pooling vector; then the second layer is processed, i.e., separating the candidate segment into two parts, a front part and a back part, each 50%, and evenly merging the feature vectors separately inside each part, to obtain two groups of pooling vectors.

Then all the pooling vectors of the two layers of the pyramid, 3 groups in total, are spliced according to the time sequence relation, to obtain a feature vector at a higher dimension, i.e., the global feature of the video segment corresponding to the time domain interval. The splicing the vectors refers to connecting two pooling vectors end to end, to obtain a pooling vector at a higher dimension.

FIG. 6 is a flowchart of an embodiment of determining an integrity score of a video segment corresponding to a time domain interval according to the embodiments of the present disclosure. As shown in FIG. 5, in this embodiment, the determining an integrity score of a video segment corresponding to a time domain interval based on a global feature may include:

602, the global feature is classified, to obtain at least one action category corresponding to the candidate segments.

For N possible action categories, the classification result may involve N+1 action category scores, where the N+1 type is a background category. N is an integer greater than 0.

In an optional example, operation 602 may be executed by a processor by invoking a corresponding instruction stored in a memory, or may be executed by a classifying sub-module run by the processor.

604, based on the global feature, the integrity degree of an action instance in a current action category included in the video segment corresponding to the time domain interval is separately identified, by means of a classifier related to at least one action category corresponding to the candidate segments, to obtain the action integrity score of the video segment corresponding to the time domain interval separately corresponding to the at least one action category.

That is, N possible action categories correspond to N classifiers; the global feature to be received by each classifier is compared with the feature of an integral action of a corresponding action category that is studied in advance, to output a score, i.e., action integrity. The action integrity score represents a degree that a time domain interval includes an integral action instance in a certain action category (i.e., possibility).

In an optional example, operation 604 may be executed by a processor by invoking a corresponding instruction stored in a memory, or may be executed by at least one classifier run by the processor.

FIG. 7 is a flowchart of another embodiment of a time domain action detecting method according to the present disclosure. As shown in FIG. 7, the time domain action detecting method of this embodiment includes:

702, actionness estimation is separately performed on at least two video segments in the video, to obtain a time sequence actionness sequence.

In an optional example, operation 702 may be executed by a processor by invoking a corresponding instruction stored in a memory, or may be executed by an action estimation sub-module run by the processor.

704, action position prediction is performed based on the time sequence actionness sequence, to obtain the time domain interval with a possible action instance; the time domain interval includes a start time and an end time, for example, represented as a start time and end time pair (start time, end time).

In an optional example, operation 704 may be executed by a processor by invoking a corresponding instruction stored in a memory, or may be executed by a position prediction sub-module run by the processor.

According to the action position prediction result, the time domain interval with at least one action instance is separately used as the current time domain interval, and operations 706-728 are executed.

706, all video segments in the current time domain interval as well as the first adjacent segment with a preset length in front of the current time domain interval and the second adjacent segment with a preset length behind the current time domain interval are extracted; all the video segments in the time domain interval for the same action instance, the first adjacent segment, and the second adjacent segment constitute the candidate segments for the same action instance.

The first adjacent segment and the second segment respectively comprise at least one video segment.

In an optional example, operation 706 may be executed by a processor by invoking a corresponding instruction stored in a memory, or may be executed by an extracting sub-module run by the processor.

708, candidate segments corresponding to the current time domain interval are used as current candidate segments, and action features of at least two video segments in the current candidate segments are separately extracted.

Then, operations 710 and 714 are executed at the same time.

710, a score of at least one video segment in the current time domain interval separately corresponding to at least one action category is separately obtained.

712, scores of all the video segments in the current time domain interval corresponding to the same action category are separately summed, to obtain the category score of the at least one action category of the video segments corresponding to the current time domain interval.

In an optional example, operations 708-712 may be performed by a processor by invoking a corresponding instruction stored in a memory, and may also be performed by a second obtaining module run by the processor.

714, based on the action feature of the video segment corresponding to the current time domain interval, the action feature of the first adjacent segment, and the action feature of the second adjacent segment, to obtain the global feature of the video segment corresponding to the current time domain interval upon time sequence structuration.

In an optional example, operation 714 may be executed by a processor by invoking a corresponding instruction stored in a memory, or may be executed by a merging sub-module run by the processor.

716, the global feature is classified, to obtain at least one action category corresponding to the current candidate segments.

In an optional example, operation 716 may be executed by a processor by invoking a corresponding instruction stored in a memory, or may be executed by a classifying sub-module run by the processor.

718, based on the global feature, a possibility of an integral action instance in a current action category included in the video segment corresponding to the time domain interval by means of a classifier related to at least one action category corresponding to the current candidate segments separately, to obtain the action integrity score of the video segment corresponding to the current time domain interval separately corresponding to the at least one action category.

Each action category corresponds to a classifier, i.e., the classifier related to the action category.

In an optional example, operation 718 may be executed by a processor by invoking a corresponding instruction stored in a memory, or may be executed by at least one classifier run by the processor.

For at least one action category in all the action categories corresponding to the video segment corresponding to the current time domain interval and the current candidate segments, operations 720-724 are executed.

720, based on the category score and action integrity score of the video segment corresponding to the time domain interval corresponding to at least one action category, a confidence value of whether the video segment corresponding to the current time domain interval includes an integral action instance corresponding to at least one action category is obtained.

Illustratively, in operation 720, at least one action category corresponding to the video segment corresponding to the current time domain interval may be used as the current action category, to calculate a product or a sum of the category score and the action integrity score of the video segment corresponding to the current time domain interval corresponding to the current action category, to obtain a confidence value of whether the video segment corresponding to the current time domain interval includes the integral action instance in the current action category.

In an optional example, operation 720 may be performed by a processor by invoking a corresponding instruction stored in a memory, and may also be performed by a second computing sub-module run by the processor.

722, for at least one action category in all the action categories corresponding to the video segment corresponding to the current time domain interval and the current candidate segments, based on whether the confidence value is greater than a preset threshold, whether the video segment corresponding to the time domain interval comprises the integral action instance in the any action category is determined.

The preset threshold in the embodiment of the present disclosure in actual applications may be set according to quality requirements on the detection result, and may be adjusted according to requirements.

In an optional example, operation 722 may be executed by a processor by invoking a corresponding instruction stored in a memory, or may be executed by a determining sub-module run by the processor.

If the video segment corresponding to the current time domain interval includes the integral action instance corresponding to the action category, operation 726 is executed. Otherwise, following procedures of this embodiment are not executed.

Correspondingly, the performing time domain pyramid-typed pooling processing on the action features of the at least two video segments in the candidate segments includes:

In an optional example, operation 724 may be executed by a processor by invoking a corresponding instruction stored in a memory, or may be executed by a determining sub-module run by the processor.

The action position detection result of the target video segment includes the detected action category corresponding to the integral action instance, the start time and end time of the action instance, which may be represented as a three-element group (action category, start time, and end time). The action position detection result of the video includes the action position detection result of at least one target video segment.

Optionally, if by means of operation 722, the number of the action categories corresponding to the integral action instance included in the target video segment is greater than 1, the detected action category corresponding to the action instance with the maximum confidence value, and the start time and end time of the action instance can be selected as the action position detection result of the target video segment.

726, separately for at least one integral action instance included in at least one target video segment: based on the global feature of the target video segment, position regression is performed on the time domain interval in the action position detecting result of the target video segment, to obtain a start-end position offset amount; the start-end position offset amount includes the position offset amount of the start time and the position offset amount of the end time.

In an optional example, operation 726 may be executed by a processor by invoking a corresponding instruction stored in a memory, or may be executed by a position regression module run by the processor.

728, the time domain interval in the action position detection result is adjusted by means of the start-end position offset amount, to obtain the adjusted action position detection result, which may be represented as a three-element group (action category, start time, and end time).

In an optional example, operation 728 may be executed by a processor by invoking a corresponding instruction stored in a memory, or may be executed by an output module run by the processor.

Optionally, when performing time domain action detection on a video, the action position detection result of the time domain interval may be output in real time when obtaining the action position detection result of the time domain interval; the action position detection result of the entire video may be output after the action position detection result of the entire video is obtained, which may include action position detection results of one or more time domain intervals.

Illustratively, the global feature of the target video segment may be input in a linear return model trained in advance, to obtain the position offset amount via prediction by the linear return model, and the time domain interval in the action position detection result is adjusted by means of the start-end position offset amount, thereby obtaining a more accurate action position detection result, so as to obtain, from the entire video, an action instance video segment closer to the start and end time of the actual action instance.

In the embodiments of the present disclosure, an initial linear return model may be trained in advance by means of a sample video, so that the trained linear return model, after receiving a video, the global feature of the candidate segment, and the time domain interval included, may accurately position the actual time domain interval for an integral action instance of a certain action category based on the global feature, so as to output the position offset amounts of the start time and the end time in the input time domain interval. When the input time domain interval is consistent with the accurate time domain, the position offset amounts of the start time and the end time are both 0. The sample video includes an integral action instance of a certain action category and the accurate time domain interval of the integral action instance of a certain action category.

In the embodiments of the present disclosure, the action start-end time (i.e., the time domain interval) in the video is adjusted more accurately by means of position return, which further improves detection accuracy under high Intersection-over-Union (IOU).

Based on the time domain action detecting method provided by the embodiments of the present disclosure, the video segment including an integral action instance of at least one action category or a specific action category in the video may be identified, to implement accurate identification and precise positioning of the integral action instance of at least one action category or a specific action category;

moreover, the score and action integrity score of the video segment corresponding to the time domain interval belonging to at least one action category can be obtained at the same time, thereby improving the execution efficiency of the entire time domain action detecting process and saving the detecting time. The embodiments of the present disclosure may be applied to the detection of videos with different lengths (including edited videos and unedited videos); when applied to the unedited long videos, identification and precise positioning effects of the action category in the video are particularly obvious.

The time domain action detecting method of the embodiments of the present disclosure can be used for detecting action instances of preset specific action categories (which may be referred to as: target action categories) of a video, for example, when applied to a vehicle driving scene to monitor whether a driver has a fatigue driving behavior (e.g., actions such as nodding the head and closing an eye) by means of a monitoring video, fatigue driving behaviors and actions such as nodding the head and closing an eye may be set as a target action category, the monitoring video is used as a video, based on the time domain action detecting method in the embodiments of the present disclosure, whether an integral action of the target action category such as completely nodding the head and closing an eye exists in the monitoring video, and each action is separately referred to as an action instance. If an integral action of the target action category such as completely nodding the head and closing an eye exists in the monitoring video, it is confirmed that the driver has a fatigue driving behavior.

In the embodiments of the present disclosure, operations 706-722 may be implemented by means of a neural network trained in advance.

Illustratively, the initial neural network model may be trained by means of a sample video segment, so that a difference between the action position detection result output by the neural network model and reference action position information (action category, start time, and end time) marked in advance of the sample video segment is smaller than a preset condition, thereby obtaining the trained neural network, where in the sample video segment is marked with the reference action position information (action category, start time, and end time) in advance.

When the time domain action detecting method of the embodiments of the present disclosure is applied to different application scenes, based on the category score and action integrity score of the video segment corresponding to the time domain interval, determining whether the video segment corresponding to the time domain interval includes the integral action instance of a target action category may be implemented by means of: identifying whether a preset action category with the category score greater than a preset first numeral number exists in the category score of the at least one action category of the video segment corresponding to the time domain interval (at this moment, it is considered that the video segment corresponding to the time domain interval belongs to the preset action category); and identifying whether a preset action category with an action integrity score greater than a preset second numeral value in the action integrity score of the video segment corresponding to the time domain interval corresponding to at least one action category (at this moment, it is considered that the video segment corresponding to the time domain interval includes the integral action instance of the preset action category).

in response to existence of at least one of the preset action category with the category score greater than the preset first numeral value or the preset action category with the action integrity score greater than the preset second numeral value, using at least one of the preset action category with the category score greater than the preset first numeral value or the preset action category with the action integrity score greater than the preset second numeral value as a target action category, and determining, based on the category score and the action integrity score of the target action category corresponding to the video segment corresponding to the time domain interval, whether the video segment corresponding to the time domain interval comprises an integral action instance in the target action category.

Accordingly, in the application embodiment, the output action position detection result may include: the target action category, start time, and end time of the integral action instance included in the video segment corresponding to the time domain interval.

Any time domain action detecting method provided in the embodiments of the present disclosure may be executed by any appropriate device having data processing capability, including, but not limited to, a terminal and a server, etc. Alternatively, any time domain action detecting method provided in the embodiments of the present disclosure may be executed by a processor, for example, any time domain action detecting method mentioned in the embodiments of the present disclosure is executed by the processor by invoking corresponding instruction stored in a memory. Details are not described below again.

A person of ordinary skill in the art may understand that all or some steps for implementing the embodiments of the foregoing method may be achieved by a program by instructing related hardware; the foregoing program can be stored in a computer readable storage medium; when the program is executed, steps including the embodiments of the foregoing method is executed. Moreover, the foregoing storage medium includes various medium capable of storing program codes such as ROM, RAM, a magnetic disk, or an optical disk.

Figure 8:
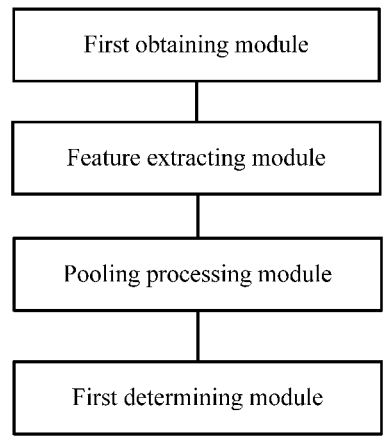
FIG. 8 is a schematic structural diagram of an embodiment of a time domain action detecting system according to the present disclosure.

FIG. 8 is a schematic structural diagram of an embodiment of a time domain action detecting system according to the present disclosure. The time domain action detecting system of the embodiments of the present disclosure may be used for implementing the time domain action detecting method of the embodiments. As shown in FIG. 8, the time domain action detecting system of the embodiment includes: a first obtaining module, a feature extracting module, a pooling processing module, and a first determining module, where:

the first obtaining module is configured to obtain a time domain interval in a video with an action instance and at least one adjacent segment in the time domain interval.

The at least one adjacent segment in the time domain interval includes: at least one of a first adjacent segment in the video with a time sequence located in front of the time domain interval, or a second adjacent segment in the video with a time sequence located behind the time domain interval. The first adjacent segment and the second segment respectively include at least one video segment.

The feature extracting module is configured to separately extract action features of at least two video segments in candidate segments, wherein the candidate segments comprises video segment corresponding to the time domain interval and adjacent segments thereof.

The pooling processing module is configured to pool the action features of the at least two video segments in the candidate segments, to obtain a global feature of the video segment corresponding to the time domain interval.

The first determining module is configured to determine, based on the global feature, an action integrity score of the video segment corresponding to the time domain interval.

Based on the time domain action detecting systems provided by the embodiments of the present disclosure, a time domain interval in a video with an action instance and at least one adjacent segment in the time domain interval are obtained, action features of the time domain interval and the at least adjacent segment of the time domain interval are extracted and performed with pooling processing, to obtain a global feature of the video segment corresponding to the time domain interval, and based on the global feature, an action integrity score of the video segment corresponding to the time domain interval is determined. The embodiments of the present disclosure relate to determining the action integrity of the video segment corresponding to the time domain interval based on the global feature comprising context information of the time domain interval, thereby benefiting accurate determination of whether the time domain interval includes an integral action instance, and improving an accuracy rate of action integrity identification.

Figure 9:
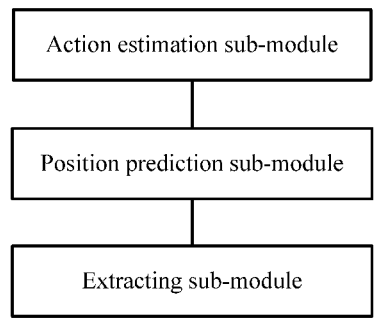
FIG. 9 is a schematic structural diagram of an embodiment of a first obtaining module according to the embodiments of the present disclosure.

FIG. 9 is a schematic structural diagram of a specific embodiment of a first obtaining module according to the embodiments of the present disclosure. As shown in FIG. 9, the first obtaining module in the embodiment may include:

an action estimation sub-module, configured to perform actionness estimation separately on at least one video segment in the video, to obtain a time sequence actionness sequence;

a position prediction sub-module, configured to perform action position prediction based on the time sequence actionness sequence, to obtain the time domain interval in the video with an action instance, the time domain interval comprising a start time and an end time; and an extracting sub-module, configured to extract, from the video, at least one of the first adjacent segment before the time domain interval or the second adjacent segment after the time domain interval.

Illustratively, the action estimation sub-module may include:

an image obtaining unit, configured to, for any video segment in the video separately: extract an image frame as an original image, extract a light stream of the any video segment, and merge obtained light stream field pictures, to obtain a spliced light stream field image;

a first sub-convolutional neural network, configured to perform actionness estimation on the original image, to obtain a first actionness value;

a second sub-convolutional neural network, configured to perform actionness estimation on the spliced light stream field image, to obtain a second actionness value;

a computing unit, configured to determine an actionness value of the any video segment based on the first actionness value and the second actionness value of a same video segment; and forming the time sequence actionness sequence by the actionness values of all video segments based on a time sequence relation.

Furthermore, in another optional example, the action estimation sub-module may further include: a normalization unit, configured to normalize the actionness value of the video segment obtained by the computing unit, to obtain a normalized actionness value. Accordingly, in the embodiment, the time sequence actionness sequence may include: a time sequence actionness sequence formed by the normalized actionness value of all video segments in the video.

Figure 10:
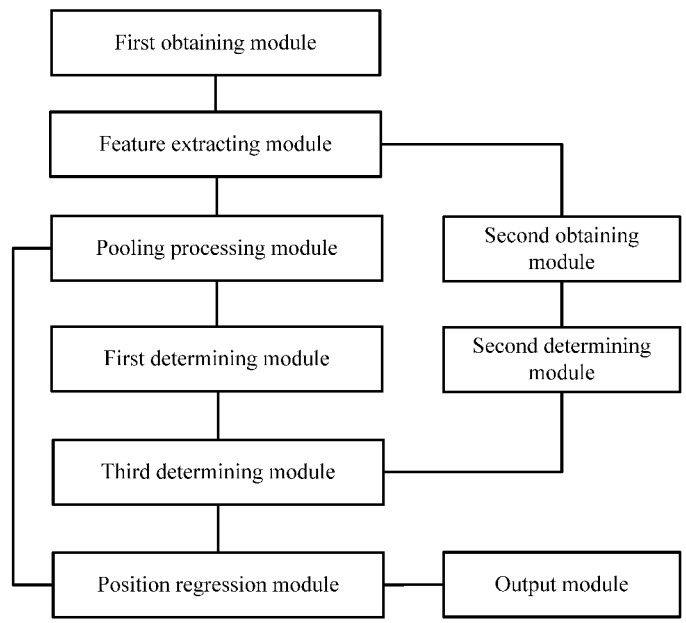
FIG. 10 is a schematic structural diagram of another embodiment of a time domain action detecting system according to the present disclosure.

FIG. 10 is a schematic structural diagram of another embodiment of a time domain action detecting system according to the present disclosure. As shown in FIG. 10, as compared with the time domain action detecting system of the embodiment above, the time domain action detecting system of this embodiment further includes: a second obtaining module and a second determining module, where:

the second obtaining module is configured to obtain, based on the action feature of the video segment corresponding to the time domain interval, a category score of at least one action category of the video segment corresponding to the time domain interval; and the second determining module is configured to determine, according to the category score of the at least one action category of the video segment corresponding to the time domain interval, a detected action category of the video segment corresponding to the time domain interval.

Further referring to FIG. 10, in another embodiment, the time domain action detecting system may further include: an output module, configured to output the time domain interval and the detected action category of the video segment corresponding to the time domain interval.

Figure 11:
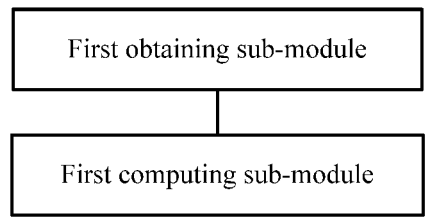
FIG. 11 is a schematic structural diagram of an embodiment of a second obtaining module according to the embodiments of the present disclosure.

FIG. 11 is a schematic structural diagram of an embodiment of a second obtaining module according to the embodiments of the present disclosure. As shown in FIG. 11, the second obtaining module in the embodiment may include:

a first obtaining sub-module, configured to separately obtain, based on the action feature of the at least one video segment corresponding to the time domain interval, a score of the at least one video segment corresponding to the time domain interval separately belonging to the at least action category; and a first computing sub-module, configured to sum scores of the at least one video segment corresponding to the time domain interval separately belonging to the same action category, to obtain the category score of the at least one action category of the video segment corresponding to the time domain interval.

Figure 12:
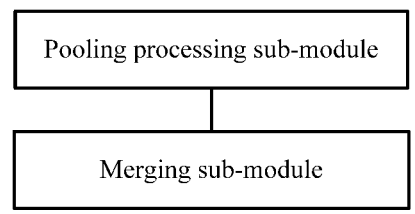
FIG. 12 is a schematic structural diagram of an embodiment of a pooling module according to the embodiments of the present disclosure.

FIG. 12 is a schematic structural diagram of an embodiment of a pooling module according to the embodiments of the present disclosure. As shown in FIG. 12, the pooling module in this embodiment may include: a pooling processing sub-module, configured to perform time domain pyramid-typed pooling processing on the action features of the at least two video segments in the extracted candidate segments based on preset configuration rules.

In one configuration rule, the number K of pooling layers and a partition part number BK of the candidate segments are included, where the values of K and BK are integers greater than or equal to 1, separately.

Based on the configuration rule, in an optional example, the value of the number K of pooling layers is 1. The pooling processing sub-module may be configured to:

identifying whether the value of the preset partition part fraction BK is 1;

if the value of the preset partition part number BK is 1, separately for any to-be-pooled segment in at least one to-be-pooled segments, obtain the pooling feature of the any to-be-pooled segment from the action features of the video segments in the any to-be-pooled segment; the to-be-pooled segment comprising the video segments in the time domain interval, the first adjacent segment, and the second adjacent segment; and merge the pooling features of all to-be-pooled segments, to obtain the global feature of the video segment corresponding to the time domain interval upon time sequence structuration; and if the value of the preset partition part fraction BK is greater than 1, segmenting all the video segments in the candidate segments into BK parts, obtaining the pooling feature of a corresponding part separately from the action features of each part of the video segments in the BK parts, and merging the pooling features of the BK parts, to obtain the global feature of the video segment corresponding to the time domain interval upon time sequence structuration.

Optionally, further referring to FIG. 12, in another embodiment of the pooling module, a merging sub-module may be selectively included to be configured to merge pooling features obtained after the time domain pyramid-typed pooling.

In an optional example, the configuration rule may include: the number K of pooling layers and a partition part number BK of the candidate segments, where the value of K of the number K of pooling layers is greater than 1 and the value of the partition part number BK is an integer greater than or equal to 1.

In the optional example, the pooling processing sub-module may be configured to: separately for the kth pooling layer: identify whether the value of the preset partition part fraction BK is 1; if the value of the preset partition part fraction BK is 1, obtain the pooling features of the candidate segments at the kth layer from the action feature of the at least one video segment in the candidate segments; and if the value of the preset partition part fraction BK is 1, segment all video segments in the candidate segments into BK parts, obtain a pooling feature of a corresponding part separately from the action features of each part of the video segments in the BK parts, and merge the pooling features of the BK parts, to obtain the pooling features of the candidate segments at the kth layer; and The merging sub-module is configured to merge the pooling features of K pooling layers at a preset manner may be performed, to obtain the global feature of the video segment corresponding to the time domain interval upon time sequence structuration.

In one optional example, the configuration rule may include: at least one of the number of pooling layers K, the partition part number BK of the video segment corresponding to the time domain interval, the first adjacent segment, or the second adjacent segment in at least one layer, where the value of the number K of pooling layers is 1 and the value of the partition part number BK is an integer greater than or equal to 1.

Hence, in the optional example, the pooling processing sub-module may be configured to: for any first to-be-pooled segment with a value of a preset partition part fraction BK to be 1, obtain a pooling feature of the any first to-be-pooled segment from the action feature of the at least one video segment in the any first to-be-pooled segment; for any second to-be-pooled segment with the value of the preset partition part fraction BK to be greater than 1, segment all video segments in the any second to-be-pooled segment into BK parts, obtain a pooling feature of a corresponding part separately from the action features of the video segments in at least one part, and merge the pooling features of the BK parts, to obtain the pooling feature of the any second to-be-pooled segment; the first to-be-pooled segment comprises the video segment corresponding to the time domain interval, any one or more of the first adjacent segment and the second adjacent segment; and the second to-be-pooled segment comprises other to-be-pooled segments in the candidate segments except the first to-be-pooled segment; and The merging sub-module may be configured to separately merge the pooling feature of the first adjacent segment, the pooling feature of the video segment corresponding to the time domain interval, and the pooling feature of the second adjacent segment may be performed, to obtain the global feature of the video segment corresponding to the time domain interval upon time sequence structuration.

In one optional example, the configuration rule may include: at least one of the number of pooling layers K, the partition part number BK of the video segment corresponding to the time domain interval, the first adjacent segment, or the second adjacent segment in at least one layer, where the value of the number K of pooling layers is greater than 1 and the value of the partition part number BK is an integer greater than or equal to 1.

Hence, in the optional example, the pooling processing sub-module may be configured to: separately for the kth pooling layer: for any first to-be-pooled segment with a value of a preset partition part number BK to be 1, obtain a pooling feature of the any first to-be-pooled segment at the kth layer from the action feature of the at least one video segment in the any first to-be-pooled segment; for any second to-be-pooled segment with the value of the preset partition part number BK to be greater than 1, segment all video segments in the any second to-be-pooled segment into BK parts, obtain a pooling feature of a corresponding part separately from the action features of the video segments of at least one part, and merge the pooling features of the BK parts, to obtain the pooling feature of the any second to-be-pooled segment at the kth layer; and separately for at least two to-be-pooled segment: merge the pooling features of K pooling layers at a preset manner, to obtain the pooling feature of the at least two to-be-pooled segments; the first to-be-pooled segment comprises any one or more of the video segment corresponding to the time domain interval, the first adjacent segment and the second adjacent segment; the second to-be-pooled segment comprises other to-be-pooled segments in the candidate segments except the first to-be-pooled segment.

The merging sub-module may be configured to separately merge the pooling feature of the first adjacent segment, the pooling feature of the video segment corresponding to the time domain interval, and the pooling feature of the second adjacent segment may be performed, to obtain the global feature of the video segment corresponding to the time domain interval upon time sequence structuration.

Figure 13:
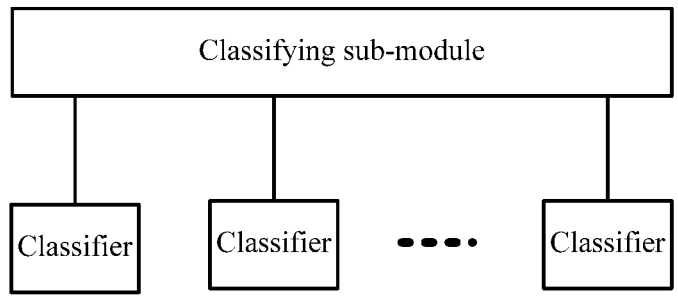
FIG. 13 is a schematic structural diagram of an embodiment of a first determining module according to the embodiments of the present disclosure.

FIG. 13 is a schematic structural diagram of an embodiment of a first determining module according to the embodiments of the present disclosure. As shown in FIG. 13, the first determining module in the embodiment may include:

a classifying sub-module, configured to classify the global feature, to obtain at least one action category corresponding to the candidate segments; and at least one classifier separately related to at least one action category corresponding to the candidate segments, configured to identify, based on the global feature, the integrity degree of an action instance in a current action category included in the video segment corresponding to the time domain interval, to obtain the action integrity score of the video segment corresponding to the time domain interval separately corresponding to the at least one action category.

Optionally, further referring to FIG. 10, another embodiment of the time domain action detecting system may further include: a third determining module, configured to determine, based on the category score and the action integrity score of the video segment corresponding to the time domain interval, whether the video segment corresponding to the time domain interval comprises an integral action instance corresponding to the at least one action category.

Figure 14:
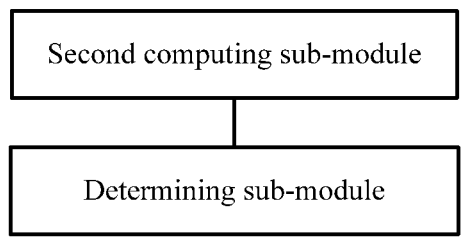
FIG. 14 is a schematic structural diagram of an embodiment of a third determining module according to the embodiments of the present disclosure.

FIG. 14 is a schematic structural diagram of an embodiment of a third determining module according to the embodiments of the present disclosure. As shown in FIG. 14, the third determining module in the embodiment may include:

a second computing sub-module, configured to, separately for any action category corresponding to the video segment corresponding to the time domain interval, calculate a product or a sum of the category score and the action integrity score of the video segment corresponding to the time domain interval corresponding to the any action category, to obtain a confidence value of whether the video segment corresponding to the time domain interval comprises the integral action instance in the any action category; and a determining sub-module, configured to determine, based on whether the confidence value is greater than a preset threshold, whether the video segment corresponding to the time domain interval comprises the integral action instance in the any action category.

Optionally, the determining sub-module may further be configured to, if the number of the action categories corresponding to the integral action instance included in the video segment corresponding to the time domain interval is greater than 1, select one action category corresponding to a maximum confidence value as a detected action category of the video segment corresponding to the time domain interval.

Moreover, further referring to FIG. 10, another embodiment of the time domain action detecting system may further include: a position return module, configured to, if the video segment corresponding to the time domain interval comprises the integral action instance of at least one action category, perform position return on the time domain interval based on the global feature, to obtain a start-end position offset amount, and adjust the time domain interval by means of the start-end position offset amount; the start-end position offset amount comprising a position offset amount between a start time and an end time in the time domain interval.

Accordingly, in this embodiment, the output module may be configured to output the adjusted time domain interval and the detected action category of the video segment corresponding to the time domain interval.

Figure 15:
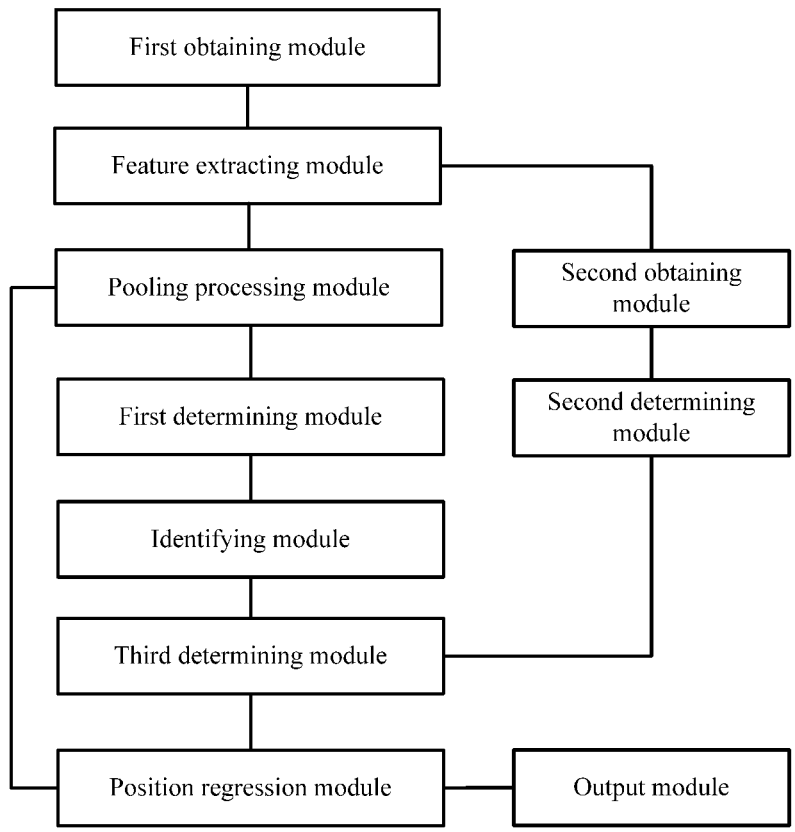
FIG. 15 is a schematic structural diagram of another embodiment of a time domain action detecting system according to the present disclosure.

FIG. 15 is a schematic structural diagram of another embodiment of a time domain action detecting system according to the present disclosure. As shown in FIG. 15, as compared with embodiments above, the time domain action detecting system in this embodiment further includes: an identifying module, configured to identify whether a preset action category with a category score greater than a preset first numeral value exists in the category scores of at least one action category of the video segment corresponding to the time domain interval; and identify whether a preset action category with an action integrity score greater than a preset second numeral value exists in the action integrity scores;

Accordingly, in this embodiment, the third determining module may be configured to, in response to existence of at least one of the preset action category with the category score greater than the preset first numeral value or the preset action category with the action integrity score greater than the preset second numeral value, use at least one of the preset action category with the category score greater than the preset first numeral value or the preset action category with the action integrity score greater than the preset second numeral value as a target action category, and determine, based on the category score and the action integrity score of the target action category corresponding to the video segment corresponding to the time domain interval, whether the video segment corresponding to the time domain interval comprises an integral action instance in the target action category.

The output module may be configured to output the target action category and the time domain interval thereof.

In addition, the embodiments of the present disclosure further provide an electronic device, including the time domain action detecting system according to any of the embodiments of the present disclosure.

In addition, the embodiments of the present disclosure further provide another electronic device, including:

a processor and a memory;

the memory, configured to store at least one executable instruction, and the executable instruction causing the processor to execute corresponding operations of the time domain action detecting method according to any one of the embodiments.

Each embodiment of the present disclosure further provides an electronic device which, for example, may be a mobile terminal, a personal computer (PC), a tablet computer, a server, and the like.

Figure 16:
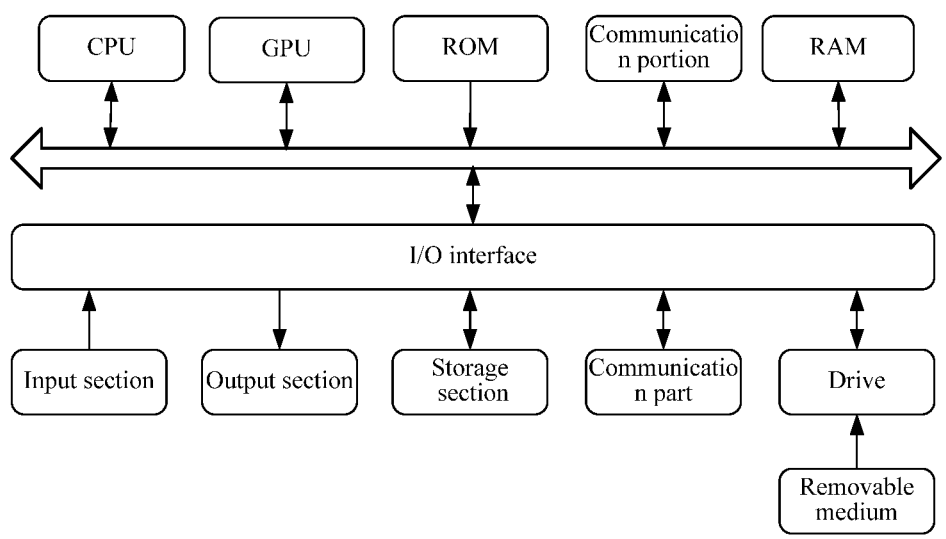
FIG. 16 is a schematic structural diagram of an application embodiment of an electronic device according to the present disclosure.

FIG. 16 is a schematic structural diagram of an application embodiment of an electronic device of the present disclosure. FIG. 16 is a schematic structural diagram of an electronic device suitable for implementing a terminal device or a server according to embodiments of the present disclosure. As shown in FIG. 16, the electronic device includes one or more processors, a communication part, and the like. The one or more processors are, for example, one or more central processing units (CPUs), and/or one or more graphic processing units (GPUs), and the like. The processor may perform various appropriate actions and processing according to executable instructions stored in a read-only memory (ROM) or executable instructions loaded from a storage section to a random access memory (RAM). The communication portion may include, but not limited to, a network card; the network card may include, but not limited to an Infiniband (IB) network card; the processor may be communicated with an ROM and/or an RAM to execute executable instructions, so as to be connected to the communication portion via a bus and communicated with other target devices via the communication portion, thereby achieving operations corresponding to any method provided by the embodiments of the present disclosure, for example, obtaining the time domain interval in the video with the action instance and at least one adjacent segment of the time domain interval, separately extracting the action features of the at least two video segments in the candidate segments, where the candidate segments include the video segment corresponding to the time domain interval and the adjacent segments thereof, performing pooling processing on the action features of the at least two video segments in the candidate segments, to obtain the global feature of the video segment corresponding to the time domain interval, and determining the action integrity score of the video segment corresponding to the time domain interval based on the global feature.

In addition, the RAM may further store various programs and data required for operations of an apparatus. The CPU, the ROM, and the RAM are connected to each other via the bus. In the presence of the RAM, the ROM is an optional module. The RAM stores executable instructions, or writes the executable instructions into the ROM during running, where the executable instructions cause the processor to execute corresponding operations of the foregoing communication method. An input/output (I/O) interface is also connected to the bus. The communication portion may be integrated, or may be configured to have a plurality of sub-modules (for example, a plurality of IB network cards) connected to the bus.

The following components are connected to the I/O interface: an input section including a keyboard, a mouse and the like; an output section including a cathode-ray tube (CRT), a liquid crystal display (LCD), a speaker and the like; the storage section including a hard disk and the like; and a communication part of a network interface card including an LAN card, a modem and the like. The communication part performs communication processing via a network such as the Internet. A drive is also connected to the I/O interface according to requirements. A removable medium such as a magnetic disk, an optical disk, a magneto-optical disk, a semiconductor memory or the like is mounted on the drive according to requirements, so that a computer program read from the removable medium may be installed on the storage section according to requirements.

It should be noted that the architecture illustrated in FIG. 16 is merely an optional implementation mode. During specific practice, the number and types of the components in FIG. 16 may be selected, decreased, increased, or replaced according to actual requirements. Different functional components may be separated or integrated or the like. For example, the GPU and the CPU may be separated, or the GPU may be integrated on the CPU, and the communication portion may be separated from or integrated on the CPU or the GPU or the like. These alternative implementations all fall within the scope of protection of the present disclosure.

Particularly, the process described above with reference to the flowchart according to an embodiment of the present disclosure may be implemented as a computer software program. For example, the embodiments of the present disclosure include a computer program product, including a computer program tangibly included on a machine readable medium; the computer program includes program codes for executing the method shown in the flowchart; the program codes may include corresponding instructions for executing steps of the method provided by the embodiments of the present disclosure, for example, an instruction for obtaining the time domain interval in the video with an action instance and at least one adjacent segment of the time domain interval; an instruction for separately extracting the action features of at least two video segments in the candidate segments, where the candidate segments include the video segment corresponding to the time domain interval and adjacent segments thereof; an instruction for performing pooling processing on the action features of the at least two video segments in the candidate segments, to obtain a global feature of the video segment corresponding to the time domain interval; and an instruction for determining an action integrity score of the video segment corresponding to the time domain interval based on the global feature. In such an embodiment, the computer program is downloaded and installed from the network through the communication part, and/or is installed from the removable medium. The computer program, when being executed by the CPU, executes the foregoing functions defined in the method of the present disclosure.

In addition, an embodiment of the present disclosure further provides a computer program, including a computer-readable code, where when the computer-readable code runs in a device, a processor in the device executes instructions for implementing the steps of the time domain action detecting method according to any one of the embodiments of the present disclosure.

In addition, an embodiment of the present disclosure further provides a computer storage medium, configured to store computer-readable instructions, where when the instructions are executed, the operations in the steps of the time domain action detecting method according to any one of the embodiments of the present disclosure are implemented.

The electronic devices and computer storage medium according to the embodiments of the present disclosure relate to determining the action integrity of the video segment corresponding to the time domain interval based on the global feature comprising context information of the time domain interval, thereby benefiting accurate determination of whether the time domain interval includes an integral action instance, and improving an accuracy rate of action integrity identification.

The embodiments of the present disclosure may, for example, be applied to processing the following scenes:

Scene 1: a video sharing website may analyze a video updated by a user to the website, automatically generate, based on the action category to which the integral action instance included in the video belongs, related tags of video content (for example, action category tags of physical exercise categories such as running, high jump, walking race, pole vault, long jump, and hop skip and jump as well as action category tags of daily life and activities), and push the most relevant segment in the video (i.e., the video segment including the integral action instance of the action category) rather than the tediously entire video to other potential uses of interest, so as to promote efficient search and rapid broadcasting of the video.

Scene 2: a user video sharing website or video live-broadcasting website needs to analyze whether a rule-violated action/behavior exists in a video uploaded by a website user or in a live-broadcasting video; detection may be performed on the video uploaded by the or the live-broadcasting video based on the time domain action detecting method provided by the embodiments of the present disclosure; if the rule-violated action/behavior exists, it is beneficial to accurately position the occurrence time and action category of the action/behavior.

Scene 3: for a monitoring scene, in a hospital, a nursing home, or even at home, based on the time domain action detecting method provided by the embodiments of the present disclosure, service staff who take care of a patient, an elder, or a child are monitored by means of a monitoring video, so as to rapidly respond to an abusive behavior.

Scene 4: during an interacting process of a robot/auto-driving vehicle and a user, it is required to detect a start or end of a specific action to guide a specific action of the robot, which is based on the time domain action detecting method provided by the embodiments of the present disclosure, so as to accurately detect a certain specific action (i.e., actions in a specific action category) in the monitoring video, precisely position the start time and end time of the specific action.

The embodiments of the present disclosure have the following total beneficial technical effects:

video segments including integral action instances of action categories or specific action categories in a to-be-detected video can be identified, so as to implement accurate identification and precise positioning of the integral action instances of action categories or specific action categories.

The category score and action integrity score of the video segment corresponding to the time domain interval belonging to each action category may be obtained at the same time, improving the execution efficiency of the entire time domain action detecting process, and saving detecting time.

A structured time domain pyramid-typed pooling method is provided; separately extracting time-space features in front of, behind, and in the time domain interval for multi-layer time domain pyramid-typed pooling may constitute the structured global feature of the candidate segments in any length, and express action features based on the time sequence, thereby positioning the video segment where an action instance in a certain action category more accurately based on the action feature of each granularity and the change of the action feature in time at the same time.

More precise adjustment is performed on the start and end time of the action of the to-be-detected video by means of position return, which further improves the detection accuracy under the high IOU.

The embodiments in the specification are all described in a progressive manner, for same or similar parts in the embodiments, refer to these embodiments, and each embodiment focuses on a difference from other embodiments. The system disclosed in the embodiments corresponds to the method disclosed in the embodiments, and therefore is described relatively simply. For related parts, reference may be made to related descriptions of the method embodiments.

The methods and devices in the present disclosure may be implemented in many manners. For example, the methods and devices in the present disclosure may be implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure may alternatively be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to enable a person of ordinary skill in the art to understand the present disclosure, so as to design various embodiments with various modifications applicable to particular use.

The invention claimed is:

1. A time domain action detecting method, the method comprising:
    obtaining a time domain interval in a video with an action instance and at least one adjacent segment in the time domain interval;
    separately extracting action features of at least two video segments in candidate segments, wherein the candidate segments comprise a video segment corresponding to the time domain interval and the adjacent segments thereof;
    pooling the action features of the at least two video segments in the candidate segments, to obtain a global feature of the video segment corresponding to the time domain interval; and
    determining, based on the global feature, an action integrity score of the video segment corresponding to the time domain interval.

2. The method according to claim 1, wherein the at least one adjacent segment comprises: at least one of a first adjacent segment in the video with a time sequence located in front of the time domain interval, or a second adjacent segment in the video with a time sequence located behind the time domain interval; and the first adjacent segment and the second segment respectively comprise at least one video segment.

3. The method according to claim 1, wherein the obtaining a time domain interval in a video with an action instance and at least one adjacent segment in the time domain interval comprises:
    performing actionness estimation separately on at least one video segment in the video, to obtain a time sequence actionness sequence;
    performing action position prediction based on the time sequence actionness sequence, to obtain the time domain interval in the video with an action instance, the time domain interval comprising a start time and an end time; and
    extracting, from the video, at least one of the first adjacent segment before the time domain interval or the second adjacent segment after the time domain interval.

4. The method according to claim 3, wherein the performing actionness estimation separately on at least one video segment in the video, to obtain a time sequence actionness sequence comprises:
    for any video segment in the video separately: extracting an image frame as an original image, and performing actionness estimation on the original image, to obtain a first actionness value; extracting a light stream of the any video segment, merging obtained light stream field pictures, to obtain a spliced light stream field image, and performing actionness estimation on the spliced light stream field image, to obtain a second actionness value;
    obtaining an actionness value of the any video segment from the first actionness value and the second actionness value; and
    forming the time sequence actionness sequence by the actionness values of all video segments based on a time sequence relation.

5. The method according to claim 4, wherein after the obtaining the actionness value of any video segment, the method further comprises:
    normalizing the actionness value of the any video segment, to obtain a normalized actionness value; and
    the time sequence actionness sequence comprising: a time sequence actionness sequence formed by the normalized actionness value.

6. The method according to claim 1, the method further comprising:
    obtaining, based on the action feature of the video segment corresponding to the time domain interval, a category score of at least one action category of the video segment corresponding to the time domain interval; and
    determining, according to the category score of the at least one action category of the video segment corresponding to the time domain interval, a detected action category of the video segment corresponding to the time domain interval.

7. The method according to claim 6, the method further comprising:
    outputting the time domain interval and the detected action category of the video segment corresponding to the time domain interval.

8. The method according to claim 6, wherein the obtaining, based on an action feature of the video segment corresponding to the time domain interval, a category score of at least one action category of the video segment corresponding to the time domain interval comprises:
  separately obtaining, based on the action feature of the at least one video segment corresponding to the time domain interval, a score of the at least one video segment corresponding to the time domain interval separately belonging to the at least action category; and
  summing scores of the at least one video segment corresponding to the time domain interval separately belonging to the same action category, to obtain the category score of the at least one action category of the video segment corresponding to the time domain interval.

9. The method according to claim 1, wherein the pooling the action features of the at least two video segments in the candidate segments comprises:
  performing time domain pyramid-typed pooling processing on the action features of the at least two video segments in the candidate segments.

10. The method according to claim 9, wherein after the performing time domain pyramid-typed pooling processing on the action features of the at least two video segments in the candidate segments, the method further comprises:
  merging pooling features obtained after the time domain pyramid-typed pooling.

11. The method according to claim 10, wherein before the performing time domain pyramid-typed pooling processing on the action features of the at least two video segments in the candidate segments, the method further comprises:
  presetting a value of the number K of pooling layers to be 1;
  the performing time domain pyramid-typed pooling processing on the action features of the at least two video segments in the candidate segments comprising:
    for any first to-be-pooled segment with a value of a preset partition part number $B_K$ to be 1, obtaining the pooling feature of the any first to-be-pooled segment from the action feature of the at least one video segment in the any first to-be-pooled segment;
    for any second to-be-pooled segment with the value of the preset partition part number $B_K$ to be greater than 1, segmenting all video segments in the any second to-be-pooled segment into $B_K$ parts, obtaining the pooling feature of a corresponding part separately from the action features of each part of the video segments in the $B_K$ parts, and merging the pooling features of the $B_K$ parts, to obtain the pooling feature of the any second to-be-pooled segment; and
    the first to-be-pooled segment comprising the video segment corresponding to the time domain interval, any one or more of the first adjacent segment and the second adjacent segment; the second to-be-pooled segment comprising other to-be-pooled segments in the candidate segments except the first to-be-pooled segment.

12. The method according to claim 10, wherein before the performing time domain pyramid-typed pooling processing on the action features of the at least two video segments in the candidate segments, the method further comprises:
  presetting a value of the number K of pooling layers to be greater than 1;
  the performing time domain pyramid-typed pooling processing on the action features of the at least two video segments in the candidate segments comprising:
    separately for the $k^{th}$ pooling layer: for any first to-be-pooled segment with a value of a preset partition part number $B_K$ to be 1, obtaining the pooling feature of the any first to-be-pooled segment at the $k^{th}$ layer from the action feature of the at least one video segment in the any first to-be-pooled segment; for any second to-be-pooled segment with the value of the preset partition part number $B_K$ to be greater than 1, segmenting all video segments in the any second to-be-pooled segment into $B_K$ parts, obtaining the pooling feature of a corresponding part separately from the action features of each part of the video segments in the $B_K$ parts, and merging the pooling features of the $B_K$ parts, to obtain the pooling feature of the any second to-be-pooled segment at the $k^{th}$ layer;
    separately for at least one to-be-pooled segment: merging the pooling features of K pooling layers at a preset manner, to obtain the pooling feature of the at least one to-be-pooled segment; and
    the first to-be-pooled segment comprising the video segment corresponding to the time domain interval, any one or more of the first adjacent segment and the second adjacent segment; the second to-be-pooled segment comprising other to-be-pooled segments in the candidate segments except the first to-be-pooled segment.

13. The method according to claim 10, wherein the merging pooling features obtained after the time domain pyramid-typed pooling, to obtain a global feature of the video segment corresponding to the time domain interval comprises:
  separately merging the pooling feature of the first adjacent segment, the pooling feature of the video segment corresponding to the time domain interval, and the pooling feature of the second adjacent segment, to obtain the global feature of the video segment corresponding to the time domain interval upon time sequence structuration.

14. The method according to claim 10, wherein before the performing time domain pyramid-typed pooling processing on the action features of the at least two video segments in the candidate segments, the method further comprises:
  presetting a value of the number K of pooling layers to be greater than 1;
  the performing time domain pyramid-typed pooling processing on the action features of the at least two video segments in the candidate segments comprising:
    separately for the $k^{th}$ pooling layer: identifying whether the value of the preset partition part number $B_K$ is 1;
    if the value of the preset partition part number $B_K$ is 1, obtaining the pooling features of the candidate segments at the $k^{th}$ layer from the action feature of the at least one video segment in the candidate segments; and
    if the value of the preset partition part number $B_K$ is greater than 1, segmenting all video segments in the candidate segments into $B_K$ parts, obtaining the pooling feature of a corresponding part separately from the action features of each part of the video segments in the $B_K$ parts, and merging the pooling features of the $B_K$ parts, to obtain the pooling features of the candidate segments at the $k^{th}$ layer.

15. The method according claim 14, wherein the merging pooling features obtained after the time domain pyramid-typed pooling, to obtain a global feature of the video segment corresponding to the time domain interval comprises:
  merging the pooling features of K pooling layers at a preset manner, to obtain the global feature of the video segment corresponding to the time domain interval upon time sequence structuration.

16. The method according to claim 10, wherein before the performing time domain pyramid-typed pooling processing on the action features of the at least two video segments in the candidate segments, the method further comprises:

presetting a value of the number K of pooling layers to be 1;

the performing time domain pyramid-typed pooling processing on the action features of the at least two video segments in the candidate segments comprising:

identifying whether the value of the preset partition part number $B_K$ is 1;

if the value of the preset partition part number $B_K$ is 1, separately for any to-be-pooled segment in at least two to-be-pooled segments, obtaining the pooling feature of the any to-be-pooled segment from the action features of the at least two video segments in the any to-be-pooled segment; the to-be-pooled segment comprising the video segments in the time domain interval, the first adjacent segment, and the second adjacent segment; merging the pooling features of all to-be-pooled segments, to obtain the global feature of the video segment corresponding to the time domain interval upon time sequence structuration; and if the value of the preset partition part number $B_K$ is greater than 1, segmenting all video segments in the candidate segments into $B_K$ parts, obtaining the pooling feature of a corresponding part separately from the action features of each part of the video segments in the $B_K$ parts, and merging the pooling features of the $B_K$ parts, to obtain the global feature of the video segment corresponding to the time domain interval upon time sequence structuration.

17. The method according to claim 1, wherein the determining, based on the global feature, an action integrity score of the video segment corresponding to the time domain interval comprises:

classifying the global feature, to obtain at least one action category corresponding to the candidate segments; and separately identifying, based on the global feature, the integrity degree of an action instance in a current action category comprised in the video segment corresponding to the time domain interval by means of a classifier related to at least one action category corresponding to the candidate segments, to obtain the action integrity score of the video segment corresponding to the time domain interval separately corresponding to the at least one action category.

18. The method according to claim 6, the method further comprising:

determining, based on the category score and the action integrity score of the video segment corresponding to the time domain interval, whether the video segment corresponding to the time domain interval comprises an integral action instance corresponding to the at least one action category.

19. The method according to claim 18, wherein the determining, based on the category score and the action integrity score of the video segment corresponding to the time domain interval, whether the video segment corresponding to the time domain interval comprises an integral action instance corresponding to the at least one action category comprises:

separately for any action category corresponding to the video segment corresponding to the time domain interval, calculating a product or a sum of the category score and the action integrity score of the video segment corresponding to the time domain interval corresponding to the any action category, to obtain a confidence value of whether the video segment corresponding to the time domain interval comprises the integral action instance in the any action category; and determining, based on whether the confidence value is greater than a preset threshold, whether the video segment corresponding to the time domain interval comprises the integral action instance in the any action category.

20. The method according to claim 19, the method further comprising:

if the number of the action categories corresponding to the integral action instance comprised in the video segment corresponding to the time domain interval is greater than 1, selecting one action category corresponding to a maximum confidence value as a detected action category of the video segment corresponding to the time domain interval.

21. The method according to claim 18, wherein the determining, based on the category score and the action integrity score of the video segment corresponding to the time domain interval, whether the video segment corresponding to the time domain interval comprises an integral action instance corresponding to the at least one action category comprises:

identifying whether a preset action category with a category score greater than a preset first numeral value exists in the category scores of at least one action category of the video segment corresponding to the time domain interval; and identifying whether a preset action category with an action integrity score greater than a preset second numeral value exists in the action integrity scores;

in response to existence of at least one of the preset action category with the category score greater than the preset first numeral value or the preset action category with the action integrity score greater than the preset second numeral value, using the at least one of the preset action category with the category score greater than the preset first numeral value or the preset action category with the action integrity score greater than the preset second numeral value as a target action category, and determining, based on the category score and the action integrity score of the target action category corresponding to the video segment corresponding to the time domain interval, whether the video segment corresponding to the time domain interval comprises an integral action instance in the target action category; and when outputting the time domain interval and the detected action category of the video segment corresponding to the time domain interval, outputting the target action category and the time domain interval thereof.

22. The method according to claim 18, the method further comprising:

if the video segment corresponding to the time domain interval comprises the integral action instance of at least one action category, performing position regression on the time domain interval based on the global feature, to obtain a start-end position offset amount, the start-end position offset amount comprising a position offset amount between a start time and an end time in the time domain interval;

adjusting the time domain interval by means of the start-end position offset amount; and when outputting the time domain interval and the detected action category of the video segment corresponding to the time domain interval, outputting the adjusted time domain interval and the detected action category of the video segment corresponding to the time domain interval.

23. A time domain action detecting apparatus, the apparatus comprising:
- at least one processor; and
- a memory storing instructions, the instructions when executed by the at least one processor, cause the at least one processor to perform operations, the operations comprising:
- obtaining a time domain interval in a video with an action instance and at least one adjacent segment in the time domain interval;
- separately extracting action features of at least two video segments in candidate segments, wherein the candidate segments comprise a video segment corresponding to the time domain interval and the adjacent segments thereof;
- pooling the action features of the at least two video segments in the candidate segments, to obtain a global feature of the video segment corresponding to the time domain interval; and
- determining, based on the global feature, an action integrity score of the video segment corresponding to the time domain interval.

24. A non-transitory computer storage medium, configured to store computer-readable instructions, wherein when the instructions are executed, operations are implemented, the operations comprising:
- obtaining a time domain interval in a video with an action instance and at least one adjacent segment in the time domain interval;
- separately extracting action features of at least two video segments in candidate segments, wherein the candidate segments comprise a video segment corresponding to the time domain interval and the adjacent segments thereof;
- pooling the action features of the at least two video segments in the candidate segments, to obtain a global feature of the video segment corresponding to the time domain interval; and
- determining, based on the global feature, an action integrity score of the video segment corresponding to the time domain interval.

* * * * *

UNITED STATES PATENT AND TRADEMARK OFFICE
CERTIFICATE OF CORRECTION

PATENT NO. : 10,915,741 B2  Page 1 of 1
APPLICATION NO. : 16/234897
DATED : February 9, 2021
INVENTOR(S) : Xiaoou Tang et al.

It is certified that error appears in the above-identified patent and that said Letters Patent is hereby corrected as shown below:

On the Title Page

Item [63], should be inserted:
--Foreign Application Priority Data
Apr. 20, 2017 (CN) ....................2017 1 0263004.2--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*